(12) United States Patent
Wang et al.

(10) Patent No.: US 10,659,344 B2
(45) Date of Patent: May 19, 2020

(54) INFORMATION TRANSMISSION METHOD, APPARATUS AND SYSTEM

(71) Applicant: ZTE CORPORATION, Shenzhen (CN)

(72) Inventors: Cui Wang, Shenzhen (CN); Zheng Zhang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/084,694

(22) PCT Filed: Aug. 17, 2016

(86) PCT No.: PCT/CN2016/095729
§ 371 (c)(1),
(2) Date: Sep. 13, 2018

(87) PCT Pub. No.: WO2017/156974
PCT Pub. Date: Sep. 21, 2017

(65) Prior Publication Data
US 2019/0075041 A1    Mar. 7, 2019

(30) Foreign Application Priority Data
Mar. 18, 2016    (CN) .......................... 2016 1 0156930

(51) Int. Cl.
*H04L 12/761* (2013.01)
*H04L 12/24* (2006.01)
(Continued)

(52) U.S. Cl.
CPC .......... *H04L 45/16* (2013.01); *H04L 41/0806* (2013.01); *H04L 45/50* (2013.01);
(Continued)

(58) Field of Classification Search
CPC ........ H04L 45/50; H04L 45/74; H04L 47/806
See application file for complete search history.

(56) References Cited

U.S. PATENT DOCUMENTS

| 2015/0078377 A1 | 3/2015 | Wijnands et al. |
| 2015/0078378 A1* | 3/2015 | Wijnands ............ H04L 12/1886 370/390 |

(Continued)

FOREIGN PATENT DOCUMENTS

| CN | 103346969 A | 10/2013 |
| CN | 104468371 A | 3/2015 |

(Continued)

OTHER PUBLICATIONS

Eckert, T. et al., "Traffic Enginering for Bit index Explicit Replication BIER-TE", draft-eckert-bier-te-arch-02, Oct. 18, 2015 (Oct. 18, 2015), section 2.2, 30 pgs.

(Continued)

*Primary Examiner* — Melanie Jagannathan
(74) *Attorney, Agent, or Firm* — Li & Cai Intellectual Property (USA) Office

(57) ABSTRACT

An information transmission method, comprising: a control platform generating forwarding information of a bit indexed explicit replication (BIER) network; and the control platform sending, according to the forwarding information of the BIER network, a BIER flow table to a forwarding device through an OpenFlow protocol. The solution solves the problems that, in a forwarding mode for a multicast message in the relevant OpenFlow technology, a space occupied by an entry is larger and the forwarding efficiency is lower because it is necessary to establish a corresponding flow table and group table on each forwarding device for each flow.

20 Claims, 12 Drawing Sheets

(51) Int. Cl.
   *H04L 12/723* (2013.01)
   *H04L 12/741* (2013.01)
   *H04L 12/26* (2006.01)
   *H04L 12/18* (2006.01)
(52) U.S. Cl.
   CPC .......... *H04L 45/745* (2013.01); *H04L 12/185* (2013.01); *H04L 41/12* (2013.01); *H04L 43/026* (2013.01)

(56) References Cited

U.S. PATENT DOCUMENTS

| | | | |
|---|---|---|---|
| 2015/0078379 A1 | 3/2015 | Wijnands et al. | |
| 2015/0083790 A1 | 3/2015 | Deev et al. | |
| 2015/0131660 A1* | 5/2015 | Shepherd | H04L 45/74 370/390 |
| 2015/0139228 A1* | 5/2015 | Wijnands | H04L 12/185 370/390 |
| 2016/0127142 A1* | 5/2016 | Tian | H04L 12/1886 370/390 |
| 2016/0254988 A1* | 9/2016 | Eckert | H04L 12/4633 370/390 |
| 2016/0277291 A1* | 9/2016 | Lakshmikanthan | H04L 45/507 |
| 2018/0205565 A1 | 7/2018 | Wijnands et al. | |

FOREIGN PATENT DOCUMENTS

| | | |
|---|---|---|
| CN | 104796340 A | 7/2015 |
| CN | 104811393 A | 7/2015 |
| CN | 105207798 A | 12/2015 |

OTHER PUBLICATIONS

International Search Report in international application No. PCT/CN2016/095729, dated Dec. 1, 2016, 2 pgs.
English Translation of the Written Opinion of the International Search Authority in international application No. PCT/CN2016/095729, dated Dec. 1, 2016, 5 pgs.
Supplementary European Search Report in European application No. 16894135.9, dated Jan. 17, 2019, 10 pgs.

* cited by examiner

INFORMATION TRANSMISSION METHOD, APPARATUS AND SYSTEM

TECHNICAL FIELD

The present disclosure relates to, but not limited to the field of Software Defined Networks (SDNs), and in particular, to an information transmission method, apparatus and system.

BACKGROUND

An SDN is a new and innovative network architecture proposed originally by the clean slate research group at the Stanford University. The OpenFlow protocol, the core technology of the SDN, separates the control plane of a network device (including an OpenFlow controller) from the data plane of the network device (including an OpenFlow switch, i.e. the OpenFlow forwarding device), therefore, the network traffic can be controlled flexibly, and a good platform is provided for the core network and the innovation of its application.

As shown in FIG. 1, it is a schematic diagram showing application of an OpenFlow protocol and an OpenFlow configuration protocol in the related art. The OpenFlow protocol is used to describe the standard of information used by the interaction between OpenFlow controllers and OpenFlow forwarding devices, and the interface standard between controllers and forwarding devices. The OpenFlow protocol also supports a Group Table, as shown in Table 1 that shows the content of a Group Table in the related art.

TABLE 1

| Group Identifier | Group Type | Counters | Action Buckets |
| --- | --- | --- | --- |

In Table 1 above, the group identifier identifies the group table. When the Group Type is all, the group table is used in forwarding multicast and broadcast flows. The Action Buckets are lists of multiple Action Sets. The forwarding process of a multicast packet in the OpenFlow protocol is: when the forwarding device (for example, the OpenFlow forwarding device) receives the multicast packet, a Flow Entry in the flow table is first matched according to the source address and the group address in the multicast packet. After the matching is successful, an Action Set in the Flow Entry may execute the "Group group-id" command, so that a group table processing is further performed on the multicast packet. When it is found that the Group Type is all after entering of the group table, the multicast packet is copied for each action bucket respectively so as to be executed. After the execution is finished, the multicast packets are forwarded out from multiple egress interfaces of the action buckets, thereby finishing the forwarding of the multicast packet. However, the foregoing forwarding manner of the multicast packet based on the OpenFlow group table is a forwarding manner which is based on the flow, that is, a Source Internet Protocol address (also referred to as S-IP) and a destination group IP address (abbreviated as: G-IP), that is, the (S, G) flow table and the group table, need to be created for each flow on each forwarding device. In a case that the topology of a multicast network remains unchanged, the more the multicast flows, the larger the entries, thus wasting the entry space extremely.

In summary, the space occupied by entries is relatively large and the forwarding efficiency is relatively low because it is necessary to establish a corresponding flow table and a corresponding group table for each flow on each forwarding device when the multicast pocket is forwarded using the related OpenFlow technology.

SUMMARY

The following is an overview of the subject matter detailed in this document. This Summary is not intended to limit the scope of the claims.

In the embodiments of the present disclosure, an information transmission method, apparatus and system are provided to solve the problem that the space occupied by the entries is relatively large and the forwarding efficiency is relatively low because it is necessary to establish a corresponding flow table and a corresponding group table for each flow on each forwarding device when the multicast pocket is forwarded using the related OpenFlow technology.

In the first aspect according to the embodiments of the present application, an information transmission method is provided. The method includes: a control platform generates forwarding information of a Bit Indexed Explicit Replication (BIER) network; and the control platform sends, a BIER flow table to one or more forwarding device through an OpenFlow protocol according to the forwarding information of the BIER network.

In an embodiment, the BIER flow table may include: multicast flow information and BIER information; or BIER forwarding information; or multicast flow information, BIER information, and BIER forwarding information.

In an embodiment, the multicast flow information may include one or more of multicast source information, multicast group information, or information configured to identify the feature of the multicast flow; the BIER information may include a BitString, the BitString is formed by a set of BIER egress forwarding devices; and the BIER forwarding information may include BitString information.

In an embodiment, the BIER forwarding information further may include BIER Multi-Protocol Label Switching (BIER-MPLS) label information or one or more of BIER Sub-domain information, BitStringLength information or Set Identifier information; and the BIER forwarding information further may include one or more of Entropy information, Time To Live (TTL) information, Type Of Service (TOS) information, or Bit Forwarding Ingress Router Identifier (BFIR-ID).

In an embodiment, an Action Set of the BIER flow table may include one or more of Push BIER Header, Pop BIER Header, Push BIER Multi-Protocol Label Switching (BIER-MPLS) header, Swap BIER-MPLS header, Pop BIER-MPLS header or Set BitString information; and the Action Set of the BIER flow table further may include one or more of Set Entropy information, Set Type Of Service (TOS) information, or Decrement Time To Live (TTL) information.

In an embodiment, the forwarding information of the BIER network generated by the control platform may include: multicast flow information and BIER egress node set information; or BIER forwarding information of each forwarding device in the network; or multicast flow information, BIER egress node set information and BIER forwarding information of each forwarding device in the network.

In an embodiment, the method may further include: before the controlling platform generates the forwarding information of the BIER network, the control platform acquires BIER network information, specifically, the BIER network information may include one or more of forwarding device information of the BIER network, network topology information, or multicast overlay information of the BIER network;

the control platform acquires the BIER network information may include:

the control platform acquires the BIER network information from an application platform APP; or the control platform acquires the BIER network information by an interface between the control platform and each of the one or more forwarding devices; or the control platform acquires the BIER network information by interfaces between the control platform and other management or control platforms.

In an embodiment, the method may further include:

the control platform listens to a first control message, specifically, the first control message is sent by a first forwarding device when a multicast receiving device served by the first forwarding device requests to join the BIER network;

the control platform updates the forwarding information of the BIER network according to the first control message; and the control platform sends, according to the updated forwarding information of the BIER network, a updated BIER flow table to an ingress forwarding device through the OpenFlow protocol.

In an embodiment, the method may further include:

the control platform listens to a second control message, specifically, the second control message is sent by a second forwarding device when a multicast source device served by the second forwarding device requests to join the BIER network;

the control platform adds the forwarding information of the BIER network according to the second control message; and the control platform sends, according to the added forwarding information of the BIER network, an added BIER flow table to the second forwarding device through the OpenFlow protocol.

In an embodiment, the control platform is a Software Defined Network (SDN) controller; or the control platform is embedded into an SDN controller as an independent functional entity; or the OpenFlow controller is embedded into the control platform as a plugin.

According to the second aspect of the present disclosure, an information transmission method is provided. The method may include: one or more forwarding devices receive, through an OpenFlow protocol, a Bit Indexed Explicit Replication (BIER) flow table sent by a control platform according to forwarding information of a BIER network; and the one or more forwarding devices forward a received multicast packet according to the BIER flow table.

In an embodiment, the BIER flow table may include: multicast flow information and BIER information; or BIER forwarding information; or multicast flow information, BIER information, and BIER forwarding information.

In an embodiment, the multicast flow information may include one or more of multicast source information, multicast group information, or information configured to identify the feature of the multicast flow; the BIER information may include a BitString, the BitString is formed by a set of BIER egress forwarding devices; and the BIER forwarding information may include BitString information.

In an embodiment, the BIER forwarding information further may include BIER Multi-Protocol Label Switching (BIER-MPLS) label information or one or more of BIER Sub-domain information, BitStringLength information or Set Identifier information; and the BIER forwarding information further may include one or more of Entropy information, Time To Live (TTL) information, Type Of Service (TOS) information, or Bit Forwarding Ingress Router identifier (BFIR-ID).

In an embodiment, an Action Set of the BIER flow table may include one or more of Push BIER Header, Pop BIER Header, Push BIER Multi-Protocol Label Switching (BIER-MPLS) header, Swap BIER-MPLS header, Pop BIER-MPLS header or Set BitString information; and the Action Set of the BIER flow table further may include one or more of Set Entropy information, Set Type Of Service (TOS) information, or Decrement Time To Live (TTL) information.

In an embodiment, the forwarding information of the BIER network may include: multicast flow information and BIER egress node set information; or BIER forwarding information of each forwarding device in the network; or multicast flow information, BIER egress node set information and BIER forwarding information of each forwarding device in the network.

In an embodiment, the method may further include:

a first forwarding device sends a first control message to the control platform when a multicast receiving device served by the first forwarding device requests to join the BIER network, the first control message being configured to indicate the control platform to update the forwarding information of the BIER network;

an ingress forwarding device receives, through the OpenFlow protocol, an updated BIER flow table sent by the control platform to the ingress forwarding device according to the updated forwarding information of the BIER network; and the ingress forwarding device forwards a received multicast packet according to the updated BIER flow table.

In an embodiment, the method further includes:

a second forwarding device sends a second control message to the control platform when a multicast source device served by the second forwarding device requests to join the BIER network, the second control message being configured to indicate the control platform to add the forwarding information of the BIER network; and the second forwarding device receives, through the OpenFlow protocol, an added BIER flow table sent by the control platform to the second forwarding device according to the added forwarding information of the BIER network.

In an embodiment, the one or more forwarding devices may include: a physical router, a physical switch, a virtual router or a virtual switch.

In the third aspect according to the embodiments of the present disclosure, an information transmission apparatus is provided. The information transmission apparatus is provided in a control platform. The information transmission apparatus may include a generation module and a sending module;

the generation module is arranged for generating forwarding information of a Bit Indexed Explicit Replication (BIER) network; and the sending module is arranged for sending, according to the forwarding information of the BIER network generated by the generation module, a BIER flow table to one or more forwarding devices through an OpenFlow protocol.

In an embodiment, the BIER flow table may include: multicast flow information and BIER information; or BIER forwarding information; or multicast flow information, BIER information, and BIER forwarding information.

In an embodiment, the multicast flow information may include one or more of multicast source information, multicast group information, or information configured to identify the feature of the multicast flow; the BIER information may include a BitString, the BitString is formed by a set of BIER egress forwarding devices; and the BIER forwarding information may include BitString information.

In an embodiment, the BIER forwarding information further may include BIER Multi-Protocol Label Switching (BIER-MPLS) label information or one or more of BIER Sub-domain information, BitStringLength information or Set Identifier information; and the BIER forwarding information further may include one or more of Entropy information, Time To Live (TTL) information, Type Of Service (TOS) information, or Bit Forwarding Ingress Router Identifier (BFIR-ID).

In an embodiment, an Action Set of the BIER flow table may include one or more of Push BIER Header, Pop BIER Header, Push BIER Multi-Protocol Label Switching (BIER-MPLS) header, Swap BIER-MPLS header, Pop BIER-MPLS header or Set BitString information; and the Action Set of the BIER flow table further may include one or more of Set Entropy information, Set Type Of Service (TOS) information, or Decrement Time To Live (TTL) information.

In an embodiment, the forwarding information of the BIER network may include: multicast flow information and BIER egress node set information; or BIER forwarding information of each forwarding device in the network; or multicast flow information, BIER egress node set information and BIER forwarding information of each forwarding device in the network.

In an embodiment, the information transmission apparatus may further include: an acquisition module arranged for acquiring BIER network information before the generation module generates the forwarding information of the BIER network, specifically, the BIER network information may include one or more of forwarding device information of the BIER network, network topology information, or multicast overlay information of the BIER network;

the acquisition module is arranged for acquiring the BIER network information in such a manner that:

the acquisition module is arranged for acquiring the BIER network information from an application platform APP; or the acquisition module is arranged for acquiring the BIER network information by an interface between the control platform and each of the one or more forwarding devices; or the acquisition module is arranged for acquiring the BIER network information by interfaces between the control platform and other management or control platforms.

In an embodiment, the information transmission apparatus may further include a listening module and an updating module;

the listening module is arranged for listening to a first control message, specifically, the first control message is sent by a first forwarding device when a multicast receiving device served by the first forwarding device requests to join the BIER network;

the updating module is arranged for updating the forwarding information of the BIER network according to the first control message listened by the listening module; and the sending module is further arranged for sending, through the OpenFlow protocol, an updated BIER flow table to an ingress forwarding device according to the forwarding information of the BIER network updated by the updating module.

In an embodiment, the information transmission apparatus may further include a listening module and an updating module;

the listening module is arranged for listening to a second control message, specifically, the second control message is sent by a second forwarding device when a multicast source device served by the second forwarding device requests to join the BIER network;

the updating module is arranged for adding new forwarding information of the BIER network according to the second control message listened by the listening module;

the sending module is arranged for sending an added BIER flow table to the second forwarding device according to the forwarding information of the BIER network added by the updating module.

In an embodiment, the control platform is a software defined network (SDN) controller; or the control platform is embedded into an SDN controller as an independent functional entity; or the OpenFlow controller is embedded into the control platform as a plugin.

In the fourth aspect according to the embodiments of the present disclosure, an information apparatus is provided. The information apparatus is provided in a control platform. The information apparatus may include a receiving module and a sending module;

the receiving module is arranged for receiving, through an OpenFlow protocol, a Bit Indexed Explicit Replication (BIER) flow table send by a control platform according to forwarding information of a BIER network; and the sending module is arranged for forwarding a received multicast packet according to the BIER flow table received by the receiving module.

In an embodiment, the BIER flow table may include: multicast flow information and BIER information; or BIER forwarding information; or multicast flow information, BIER information, and BIER forwarding information.

In an embodiment, the multicast flow information may include one or more of multicast source information, multicast group information, or information configured to identify the feature of the multicast flow; the BIER information may include a BitString, the BitString is formed by a set of BIER egress forwarding devices; and the BIER forwarding information may include BitString information.

In an embodiment, the BIER forwarding information further may include BIER Multi-Protocol Label Switching (BIER-MPLS) label information or one or more of one or more of BIER Sub-domain information, BitStringLength information or Set Identifier information; and the BIER forwarding information further may include one or more of Entropy information, Time To Live (TTL) information, Type Of Service (TOS) information, or Bit Forwarding Ingress Router identifier (BFIR-ID).

In an embodiment, an Action Set of the BIER flow table may include one or more of Push BIER Header, Pop BIER Header, Push BIER Multi-Protocol Label Switching (BIER-MPLS) header, Swap BIER-MPLS header, Pop BIER-MPLS header or Set BitString information; and the Action Set of the BIER flow table further may include one or more of Set Entropy information, Set Type Of Service (TOS) information, or Decrement Time To Live (TTL) information.

In an embodiment, the forwarding information of the BIER network may include: multicast flow information and BIER egress node set information; or BIER forwarding information of each forwarding device in the network; or multicast flow information, BIER egress node set information and BIER forwarding information of each forwarding device in the network.

In an embodiment, the information transmission apparatus is provided on a first forwarding device, specifically, the sending module is further arranged for sending a first control message to the control platform when a multicast receiving device served by the first forwarding device requests to join the BIER network, and specifically, the first control message is configured to indicate the control platform to update the forwarding information of the BIER network;

in the information transmission apparatus arranged for an ingress forwarding device, the receiving module is further arranged for receiving, through the OpenFlow protocol, an updated BIER flow table sent by the control platform to the ingress forwarding device according to the updated forwarding information of the BIER network; and the sending module is further arranged for forwarding a received multicast packet according to the updated BIER flow table received by the receiving module.

In an embodiment, the information transmission apparatus is provided on a second forwarding device, specifically, the sending module is further arranged for sending a second control message to the control platform when a multicast source device served by the second forwarding device requests to join the BIER network, specifically, the second control message is configured to indicate the control platform to add the forwarding information of the BIER network; and the receiving module is further arranged for receiving, through the OpenFlow protocol, an added BIER flow table sent by the control platform to the second forwarding device according to the added forwarding information of the BIER network.

In an embodiment, the one or more forwarding devices may include: a physical router, a physical switch, a virtual router or a virtual switch.

In the fifth aspect according to the embodiments of the present disclosure, a data transmission system is provided. The data transmission system may include a control platform and a plurality of forwarding devices; specifically, the control platform is provided with the information transmission device according to any one of the embodiments in the third aspect, and each forwarding device is provided with the information transmission device according to any one of embodiments in the fourth aspect.

The embodiment of the present disclosure further provides a computer readable storage medium containing computer executable instructions, the computer executable instructions can implement any one of the information transmission method in the first aspect when be executed.

The embodiment of the present disclosure further provides a computer readable storage medium containing computer executable instructions, the computer executable instructions can implement any one of the information transmission method in the second aspect when be executed.

The embodiments of the present disclosure provide an information transmission method, apparatus and system. a control platform generates forwarding information of BIER network and sends, according to the forwarding information of the BIER network, a BIER flow table to one or more forwarding devices through an OpenFlow protocol, thus indicating the one or more forwarding devices to send the received multicast packet in a multicast manner according to the BIER flow table. In the embodiments of the present disclosure, through sending the BIER flow table to the one or more forwarding devices, the multicast flow can be added by only changing the BIER flow table for the ingress forwarding device when the network topology is unchanged. The embodiments of the present disclosure solve the problem that the space occupied by the entries is relatively large and the forwarding efficiency is relatively low because it is necessary to establish a corresponding flow table and a corresponding group table on each forwarding device for each flow when the multicast pocket is forwarded using the related OpenFlow technology.

Other aspects will be apparent upon reading and understanding the drawings and detailed description.

BRIEF DESCRIPTION OF DRAWINGS

The drawings are used to provide a further understanding of the technical solutions of the present application, and constitute a part of the specification, which is used to explain the technical solutions of the present application together with the embodiments of the present application, and does not constitute a limitation of the technical solutions of the present application.

DETAILED DESCRIPTION

The disclosure will be further described in detail with reference to the accompanying drawings. It should be noted that, in the case of no conflict, the feature of the embodiments and the embodiments in the present application may be arbitrarily combined with each other.

The operations illustrated in the flowchart of the figures may be executed in a computer system such as a set of computer executable instructions. Also, although logical sequences are shown in the flowcharts, in some cases the operations shown or described may be performed in a different order than the ones described herein.

Figure 1:
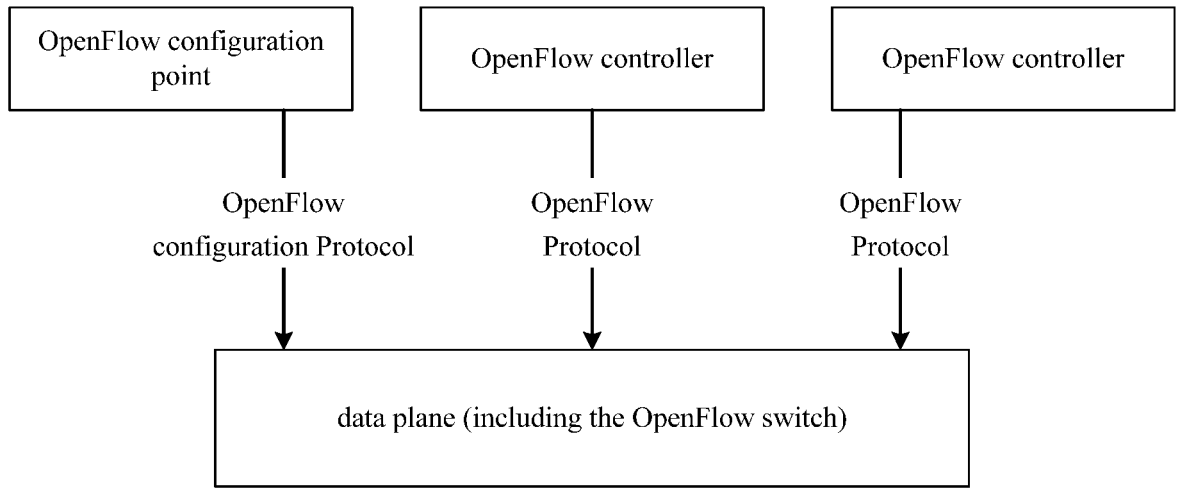
FIG. 1 is a schematic diagram of an application of an OpenFlow protocol and an OpenFlow configuration protocol in the related art.
Figure 2:
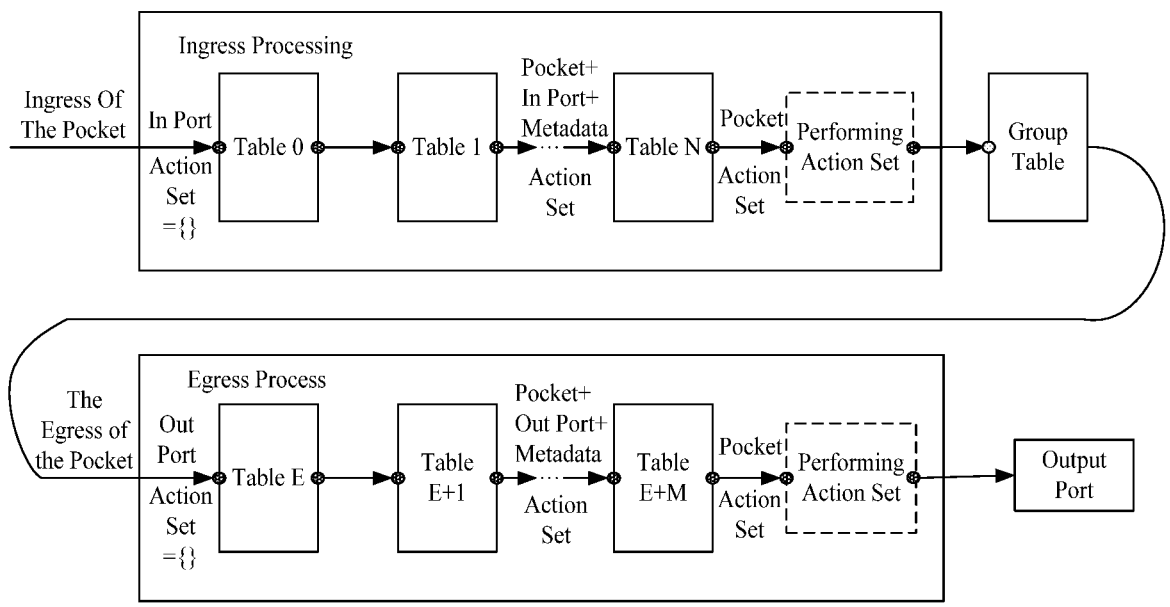
FIG. 2 is a schematic diagram of forwarding the packet taking an OpenFlow pipeline in the related art.

First, the packet forwarding manner which is based on the OpenFlow flow table in an SDN is introduced. The core part of the OpenFlow protocol is a collection of the information structure used for the OpenFlow protocol. The OpenFlow flow tables or orchestrated multiple flow tables are cascaded into a pipeline which includes ingress multi-levels flow table and the egress multi-levels flow table, and used to configure the forwarding path of the OpenFlow forwarding device. As shown in FIG. 2, it is a schematic diagram of forwarding the packet using an OpenFlow pipeline in the related art. As shown in Table 2, it is entries of a flow table in the related art.

TABLE 2

| Match Fields | Priority | Counters | Instruction | Timeouts | Cookie | Flags |
| --- | --- | --- | --- | --- | --- | --- |

As shown in Table 2 above, the entries of the flow table usually includes field information such as Match Fields, Priority, Counters, Instructions and the like. Herein, the Match Fields are input keywords for packet matching and used by the OpenFlow forwarding device to match a flow table. The Counters are various statistical information to be used to perform management. The Instructions refer to the operation instructions for the pocket, including the Action Set such as discarding the pocket, forwarding the pocket to the designated port, setting the filed value of the pocket header, adding the package label, switching the packet to the next flow table, performing the group table process, etc. The Action Set is associated with each packet, and the packet is passed among the multiple flow tables in the streamline and modified by the instruction of each flow table. All the actions in the Action Set are executed until the streamline ends or when the instructions of the matched flow table requires to execute the Action Set.

Figure 3:
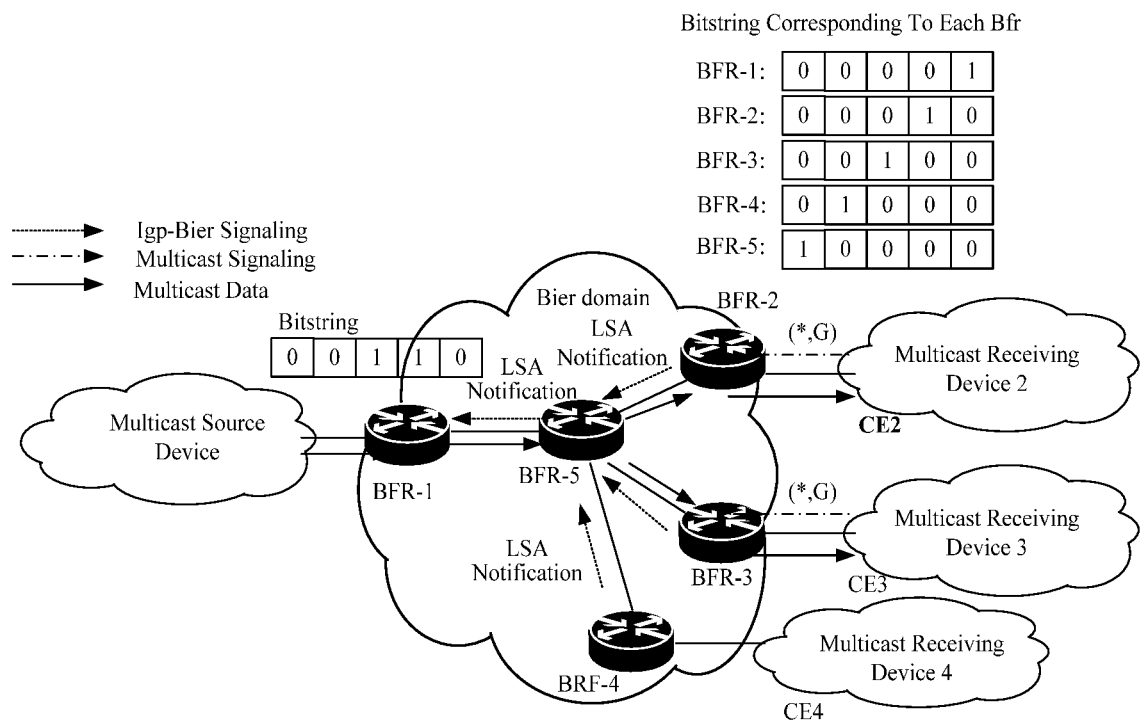
FIG. 3 is a schematic diagram of a network element architecture in a related BIER technology.

In the above background technology, it has been pointed out that the forwarding manner of the multicast packet based on the OpenFlow flow table has the problem that the space occupied by the entries is relatively large and the forwarding efficiency is relatively low. At present, the Internet Engineering Task Force (IETF) has begun to develop a multicast packet forwarding technology, i.e. Bit Index Explicit Replication (BIER) technology. As shown in FIG. 3, it is a schematic diagram of the network element architecture in the related BIER technology. The core idea of the BIER technology is that: each node in the network is represented by only one bit, the transmission of the multicast packets in the network is not in a form of multicast IP packets, but is in a form of being packaged in a specific BIER header; the BIER header directly or indirectly includes basic information of the BIER and BitString information, for example, the BIER basic information may directly include the three element information which comprises Sub-domain information, BitStringLength information, and Set Identifier information; as another example, the BIER basic information can also uniquely identify the above three element information by means of a label indirectly; herein, the BIER basic information is used to position the Bit Index Forwarding Table (BIFT), all destination nodes of the multicast packet are marked by the BitString information, the intermediate node can be routed by searching for the BIFT according to the information in the BIER header, thus ensuring that the multicast packet can be sent to all destination nodes. When the multicast network topology is unchanged, the BIFT is unchanged. That is to say, the BIFT is a forwarding based on the network topology, not a forwarding based on flow. No matter how many packets, only the forwarding entries on the head node can be affected and the multicast forwarding table on other forwarding devices cannot be affected. Therefore, even when a multicast receiving device or a multicast source device dynamically joins in the network, it is only necessary to update the BIFT in the head node.

In order to solve the problem existing in the forwarding manner of the multicast packets in the related OpenFlow technology, in the embodiments of the present disclosure, a forwarding manner of the multicast packet is proposed based on the BIER technology in an OpenFlow technology, so that the multicast packets can be forwarded efficiently and the space occupied by the entry can be decreased under a premise that the network traffic is flexibly controlled.

The technical solution of the present application will be described in detail below through embodiments. In the embodiments of the present application, the control platform may be an SDN controller. Alternatively, the control platform may be embedded into an SDN controller as an independent functional entity, and the control platform cooperates with an OpenFlow controller as an independent function entity. Alternatively, in the embodiments of the present disclosure, the OpenFlow controller is embedded into the control platform of the as a plugin. In the embodiments of the present application, the forwarding device may be for example an OpenFlow forwarding device, such as including a physical router, a physical switch, a virtual router, or a virtual switch. The embodiments of the present application may be combined with each other, and the same or similar concepts or processes may not be described again in some embodiments.

Figure 4:
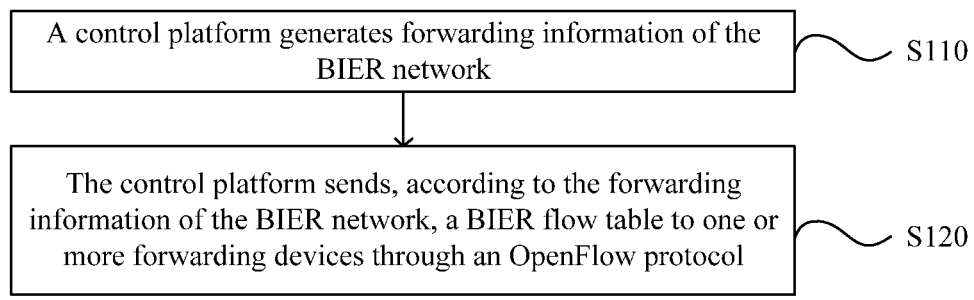
FIG. 4 is a flowchart of an information transmission method according to an embodiment of the present disclosure.

FIG. 4 is a flowchart of an information transmission method according to an embodiment of the present disclosure. The information transmission method in this embodiment is applicable to the situation that the multicast packet is forwarded in the SDN network. The method can be implemented by an information transmission apparatus. The information transmission apparatus can be implemented by combining hardware and software. The information transmission apparatus can be integrated into a processor of a control platform for use by the processor. As shown in FIG. 4, the method in this embodiment can include:

In operation S110, a control platform generates forwarding information of the BIER network.

The information transmission method according to the embodiments of the present disclosure forwards the multicast packet in an SDN network in a forwarding manner which is based on the BIER technology. The forwarding operation of the multicast packet is performed through the BIER flow table. Therefore, first, the control platform can acquire the BIER network information. The BIER network information may include one or more of forwarding device information of the BIER network, network topology information, or multicast overlay information of the BIER network. The control platform in this embodiment can generate the forwarding information of the BIER network according to the BIER network information after acquiring the BIER network information. The forwarding information of the BIER network may include: multicast flow information and BIER egress node set information; or BIER forwarding information of each forwarding device in the network; or multicast flow information, BIER egress node set information and BIER forwarding information of each forwarding device in the network.

In operation S120, the control platform sends, according to the forwarding information of the BIER network, a BIER flow table to one or more forwarding devices through an OpenFlow protocol.

The BIER flow table in this embodiment is different from the OpenFlow flow table in the related art. As mentioned above, during the forwarding process of the BIER multicast packet, the BIER basic information packaged in the BIER header is used to position the BIFT. All egress forwarding devices are marked by the BitString. Therefore, in this embodiment, the BIER flow table sent by the control platform includes information corresponding to the forwarding information of the BIER network. In this embodiment, the BIER flow table sent by the control platform to the one or more forwarding devices includes: multicast flow information and BIER information; or BIER forwarding information; or multicast flow information, BIER information, and BIER forwarding information. It can be seen that, the content of the information in the BIER flow table corresponds to the content of the forwarding information of the BIER network generated by the control platform.

It should be noted that, in the forwarding information of the BIER network, the multicast flow information and the BIER information are just sent to the ingress forwarding device, such as Bit Forwarding Ingress Router (BFIR). Herein, the multicast flow information includes one or more of multicast source information, multicast group information, or information configured to identify the feature of the multicast flow, and the BIER information includes a BitString, the BitString is formed by a set of BIER egress forwarding devices. Further, the BIER forwarding information is sent to each forwarding device, such as Bit Forwarding Router (BFR).

In embodiments of the present disclosure, the BIER flow table is generated by the forwarding information of the BIER network. That is to say, the transmission of the multicast packet among the forwarding devices is not in a form of multicast IP packets, but is in a form of being packaged in a specific BIER header. Therefore, the intermediate forwarding device can search for the BIER flow table according to the information in the BIER header and perform the routing. All egress forwarding devices of the multicast packet are marked by the information in the BIER header, which can ensure that the multicast packet can be forwarded to all egress forwarding devices.

Through the information transmission method in this embodiment, the BIER flow table in any forwarding device does not need to be changed, i.e. the control platform also does not need to update the BIER flow table, when the network topology and the flow performing the multicast packet transmission are unchanged. Further, even when the multicast packet which is need to be sent in the network is added, only the BIER flow table for the ingress forwarding device can be affected, the BIER flow tables in other forwarding devices cannot be affected. That is to say, the transmission of different flows can be implemented when the control platform only updates the BIER flow table in the egress forwarding device. Compared with the group table forwarding manner which is based on the flow in the related OpenFlow technology, a system space occupied by the flow table is greatly decreased and the forwarding efficiency for the multicast packet can be increased.

It should be noted that, in this embodiment, the operation that the control platform sends the BIER flow table can be performed in advance before the one or more forwarding device receive the multicast packet, or can be performed after the one or more forwarding devices receive the multicast packet. Herein, after the one or more forwarding devices receive the multicast packet, if the BIER flow table is not matched, the related information of the multicast packet to be forwarded is transmitted to the control platform, then the control platform sends an updated BIER flow table to the one or more forwarding device.

In the information transmission method according to this embodiment, the control platform generates the forwarding information of the BIER network, and sends a BIER flow table to the one or more forwarding devices according to the generated forwarding information of the BIER network through the OpenFlow protocol, thus indicating the one or more forwarding devices to send the received multicast packet in a multicast manner according to the BIER flow table. In this embodiment, through sending the BIER flow table to the one or more forwarding devices, the multicast flow can be added by only changing the BIER flow table for the ingress forwarding device when the network topology is unchanged. This embodiment solves the problem that the space occupied by the entries is relatively large and the forwarding efficiency is relatively low because it is necessary to establish a corresponding flow table and a corresponding group table on each forwarding device for each flow when the multicast packet is forwarded using the related OpenFlow technology.

Figure 5:
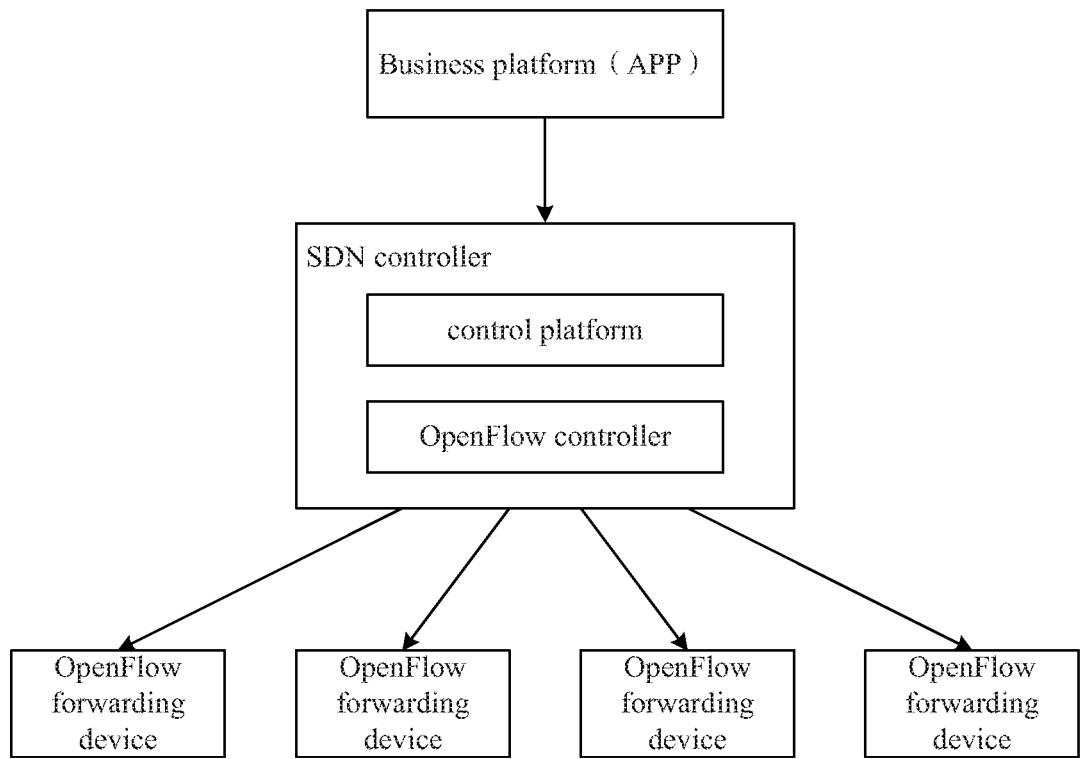
FIG. 5 is a schematic diagram of an application scenario for the data transmission method according to the embodiment shown in FIG. 4.

In this embodiment, the control platform can generate the forwarding information of the BIER network through the BIER network information, that is, before the operation S110 in the above embodiment, the method may further include: the control platform acquires the BIER network information. The BIER network information includes one or more of forwarding device information of the BIER network, network topology information, or multicast overlay information of the BIER network. In an implementation of this embodiment, the manner in which the control platform acquires the BIER network information can be the control platform acquires the BIER network information from an Application (APP). In this embodiment, the BIER network information can be transmitted to the control platform by the Graphical User Interface (GUI) of the APP. As another example, the BIER network information also can be transmitted by the RESTful interface between the APP and the control platform. As shown in FIG. 5, it is a schematic diagram of an application scenario for the data transmission method according to the embodiment shown in FIG. 4. In the embodiment shown in FIG. 5, the control platform can be embedded into the SDN controller as an independent functional entity and cooperate with the OpenFlow controller.

Figure 6:
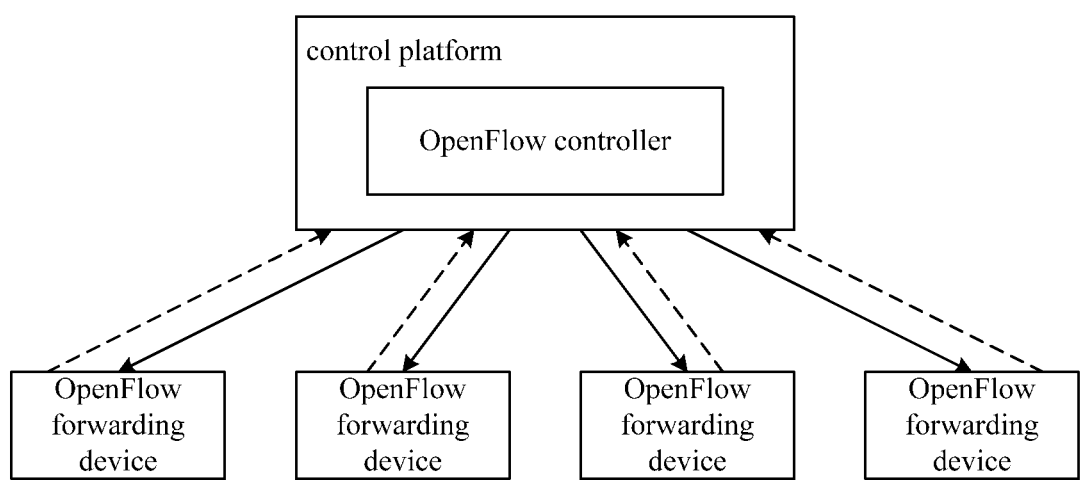
FIG. 6 is a schematic diagram of another application scenario for the data transmission method according to the embodiment shown in FIG. 4.

In another implementation of this embodiment, the manner in which the control platform acquires the BIER network information may also be: the control platform acquires the BIER network information by the interface between the control platform and each of the one or more forwarding devices. In this embodiment, the interface between the control platform and each of the one or more forwarding devices is the interface using the OpenFlow protocol. As shown in FIG. 6, it is a schematic diagram of another application scenario for the data transmission method according to the embodiment shown in FIG. 4. In FIG. 6, solid line arrows are the direction of the packet in which the control platform sends the BIER flow table to the one or more forwarding devices, and broken line arrows are the direction of the packet in which the control platform acquires the BIER network information. In the embodiment shown in FIG. 6, the OpenFlow controller may be embedded into the control platform as a plugin.

Figure 7:
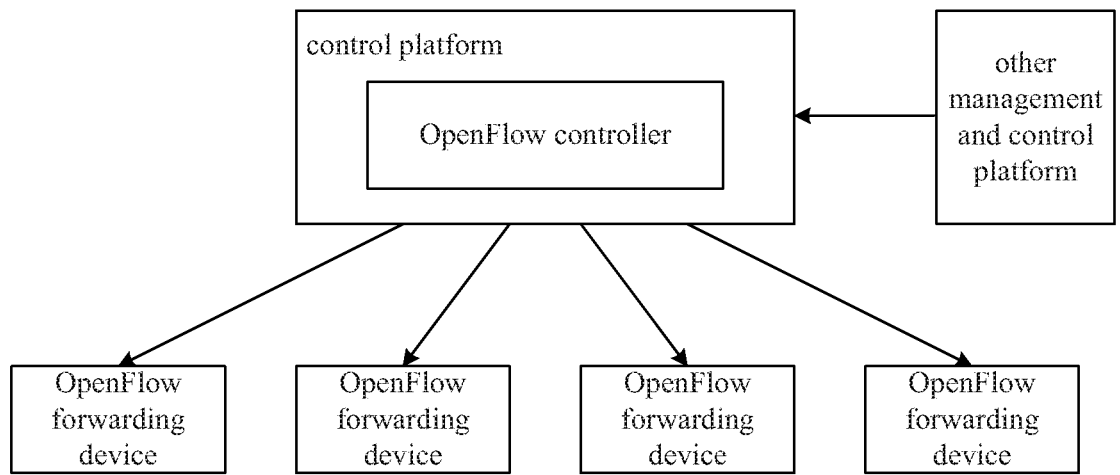
FIG. 7 is a schematic diagram of yet another application scenario for the data transmission method according to the embodiment shown in FIG. 4.

In yet another implementation of this embodiment, the manner in which the control platform acquires the BIER network information may further be: the control platform acquires the BIER network information by the interface between the control platform and other management and control platforms. In this embodiment, the other management and control platforms can be for example, an OpenFlow configuration point, a Border Gateway Protocol Label Switching (BGP_LS) or Path Computation Element Protocol (PCEP) controller. As shown in FIG. 7, it is a schematic diagram of yet another application scenario for the data transmission method according to the embodiment shown in FIG. 4. In the embodiment shown in FIG. 7, the OpenFlow controller can also be embedded into the control platform as a plugin.

Figure 8:
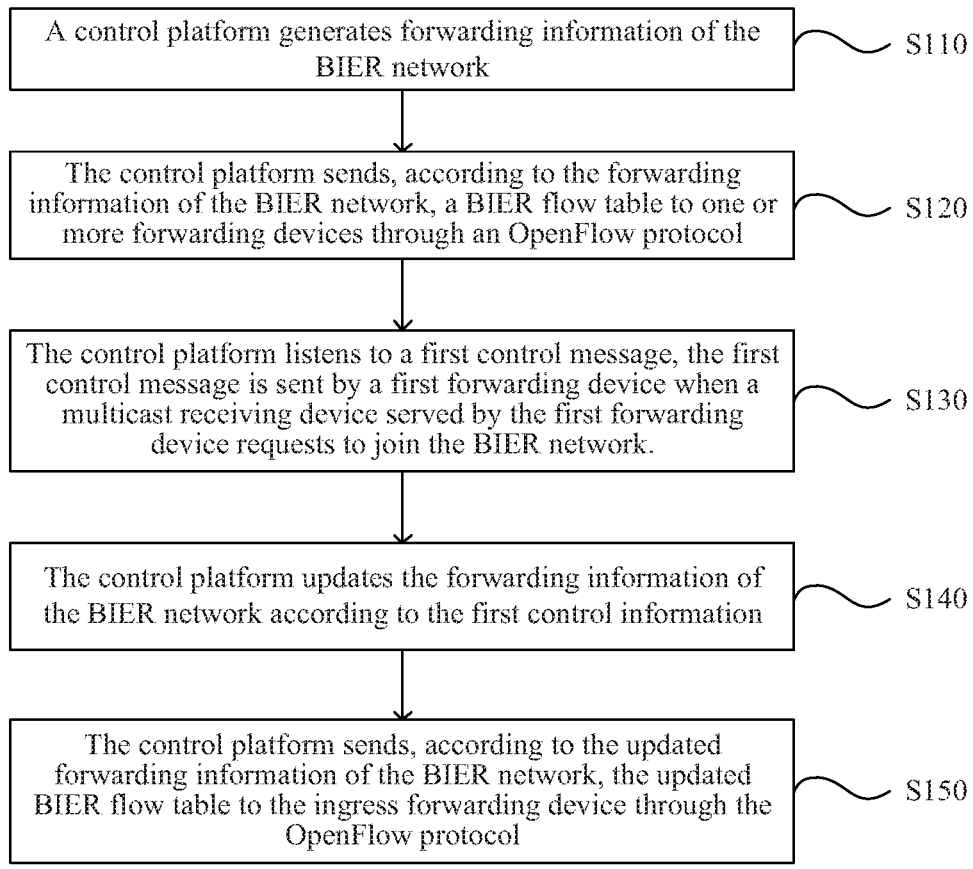
FIG. 8 is a flowchart of another information transmission method according to an embodiment of the present disclosure.

Optionally, FIG. 8 is a flowchart of another information transmission method according to an embodiment of the present disclosure. On the basis of the embodiment shown in above FIG. 4, the method according to this embodiment may further include:

In operation S130, the control platform listens to a first control message, the first control message is sent by a first forwarding device when a multicast receiving device served by the first forwarding device requests to join the BIER network.

Figure 9:
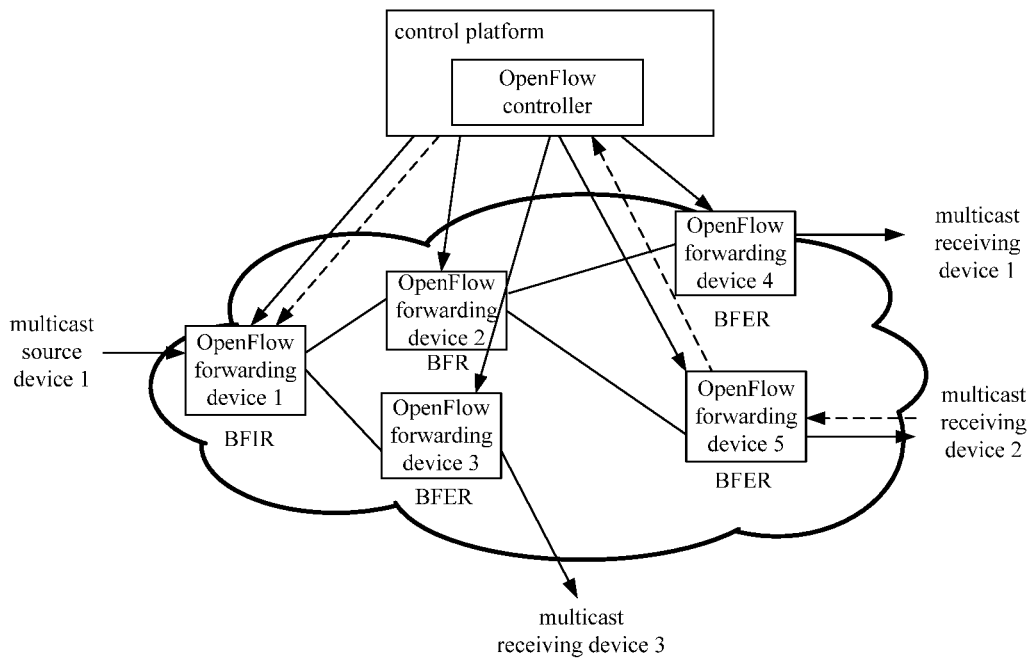
FIG. 9 is a schematic diagram of an application scenario in a data transmission manner according to the embodiment shown in FIG. 8.

As shown in FIG. 9, it is a schematic diagram of an application scenario for the data transmission method according to the embodiment shown in FIG. 8 In the application scenario shown in FIG. 9, the OpenFlow controller may also be embedded into the control platform as a plugin. The OpenFlow forwarding device 5 is the first forwarding device, i.e. the egress forwarding device. When the multicast receiving device 2 requests to dynamically join the BIER network in order to receive the multicast packet sent by the multicast source device 1, the OpenFlow forwarding device 5 that is close to the multicast receiving device 2 sends information indicating that the multicast receiving device 2 has been dynamically joined through the OpenFlow control message to the OpenFlow controller, or the OpenFlow forwarding device 5 may send the message to the respective controller through other control messages, then the controller gives feedback to the control platform that the multicast receiving device 2 has been dynamically joined.

In operation S140, the control platform updates the forwarding information of the BIER network according to the first control information.

In operation S150, the control platform sends, according to the updated forwarding information of the BIER network, the updated BIER flow table to the ingress forwarding device through the OpenFlow protocol.

In this embodiment, after the control platform found that the new multicast receiving device (i.e. multicast receiving device 2) has been dynamically joined, the control platform can update the forwarding information of the BIER network according to the information of the joined multicast receiving device 2, and send the updated BIER flow table to the egress forwarding device according to the updated forwarding information of the BIER network. The egress forwarding node of the multicast packet is affected by the joined multicast receiving device, therefore, it is necessary to update the BIER flow table, and update the BIER flow table on the ingress forwarding device (i.e. the OpenFlow forwarding device 1).

It should be noted that, the execution sequence of operations S130 to S150 in this embodiment and operations S110 and S120 in the above embodiment are not limited, and operations S130 to S150 may be performed before operations S110 and S120, or may be performed after the operations S110 and S120, the embodiment shown in FIG. 8 is an example that operations S130 to S150 are performed after the operation S120.

Figure 10:
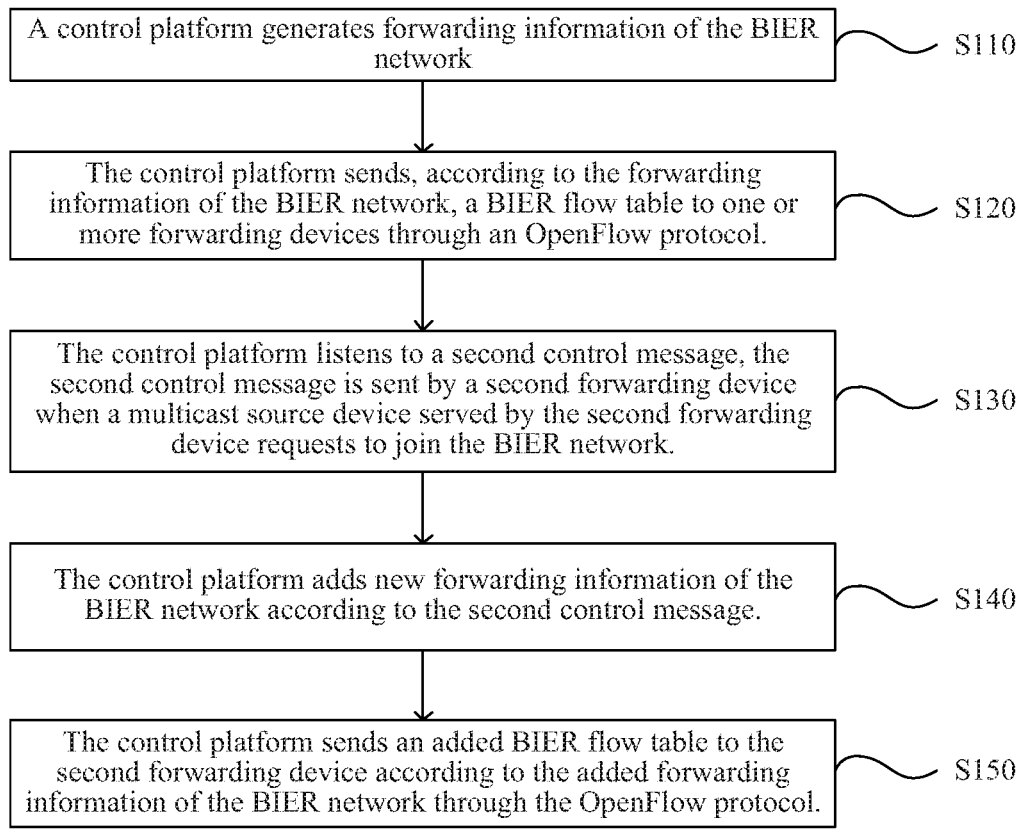
FIG. 10 is a flowchart of yet another information transmission method according to an embodiment of the present disclosure.

Optionally, FIG. 10 is a flowchart of yet another information transmission method according to an embodiment of the present disclosure. On the basis of the embodiment shown in above FIG. 4, the method according to this embodiment may further include:

In operation S130, the control platform listens to a second control message, the second control message is sent by a second forwarding device when a multicast source device served by the second forwarding device requests to join the BIER network.

Figure 11:
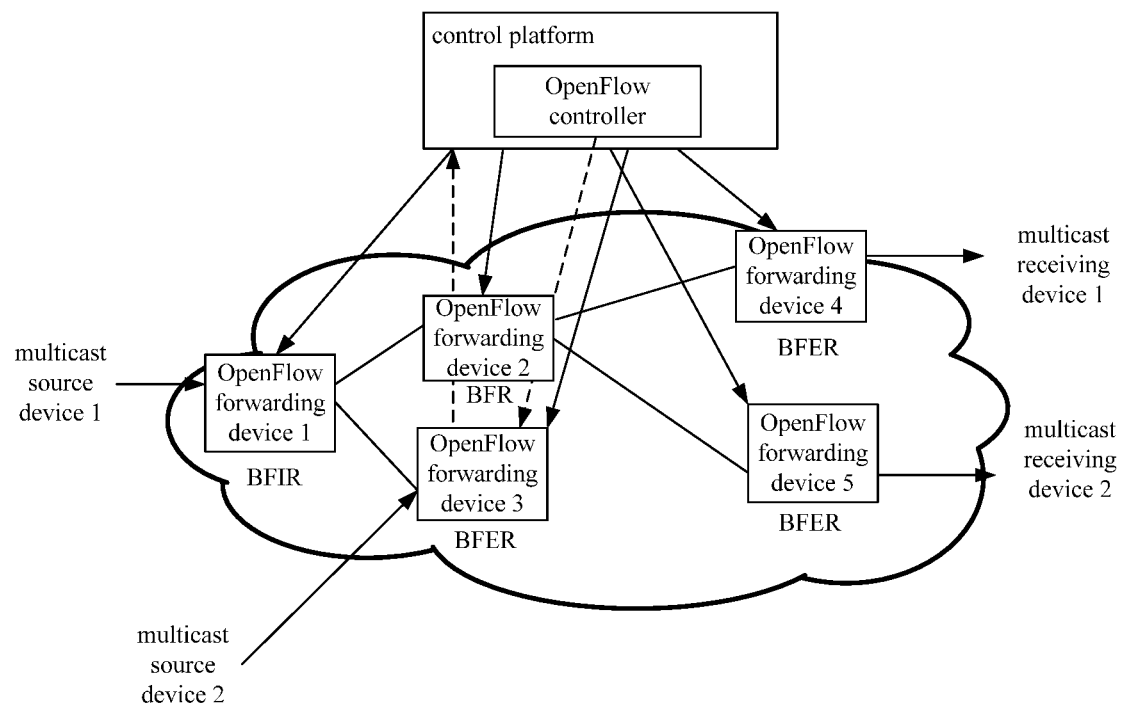
FIG. 11 is a schematic diagram of an application scenario for the data transmission method according to the embodiment shown in FIG. 10.

As shown in FIG. 11, it is a schematic diagram of an application scenario for the data transmission method according to the embodiment shown in FIG. 10. In the application scenario shown in FIG. 11, the OpenFlow forwarding device 3 is the second forwarding device (i.e. the ingress forwarding device). When the multicast source device 2 requests to dynamically join the BIER network in order to send the multicast packet to the multicast receiving device 1 and the multicast receiving device 2, the OpenFlow forwarding device 3 that is close to the multicast source device 2 transmits the information of the multicast source device to the OpenFlow controller through the OpenFlow control message, or the OpenFlow forwarding device 3 may send the information of the multicast source device to the respective controller through other control messages, then the controller gives feedback to the control platform that the multicast receiving device 2 has been dynamically joined.

In operation S140, the control platform adds the forwarding information of the BIER network according to the second control message.

In operation S150, the control platform sends an added BIER flow table to the second forwarding device according to the added forwarding information of the BIER network through the OpenFlow protocol.

In this embodiment, after the control platform knows that the multicast source device 2 has been dynamically joined the BIER network and needs to send the multicast packet, the control platform found that the multicast receiving device 1 and the multicast receiving device 2 need to receive the multicast packet sent by the multicast source device 2. Therefore, the control platform needs to add the BIER flow table on the ingress OpenFlow forwarding device (i.e.

OpenFlow forwarding device 3) which is used to receive the multicast packet from the multicast source device 2.

It should be noted that, the execution sequence of operations S130 to S150 in this embodiment and operations S110 and S120 in the above embodiment are not limited, and operations S130 to S150 may be performed before operations S110 and S120, or may be performed after the operations S110 and S120, the embodiment shown in FIG. 10 is an example that operations S130 to S150 are performed after the operations S110 and S120.

It can be seen from the above embodiments shown in FIG. 8 and FIG. 10, when a multicast receiving device or a multicast source device dynamically joins the BIER network, only the BIER flow table for the ingress forwarding device needs to be updated, and only the updated BIER flow table needs to be sent. Through the information transmission method according to this embodiment, the scope and content of the flow table to be updated is decreased, which is beneficial to decrease the space occupied by the flow table and to effectively improve the forwarding efficiency for the multicast packet, compared with the updating manner in the related OpenFlow in which once a multicast receiving device or a multicast source device has been dynamically joined the BIER network, the flow tables and the group tables in all OpenFlow forwarding devices need to be updated and the updated flow tables and the updated group tables need to be sent to each OpenFlow forwarding device.

In the implementation of this embodiment of the present disclosure, the content of the BIER flow table transmitted through the OpenFlow protocol is different from the content of the flow table in the related OpenFlow technology, therefore, it is necessary to extend the OpenFlow protocol to support the transmission of the BIER flow table including the forwarding information of the BIER network. The message format of the OpenFlow Experimenter Message in the related art is as follows:

```
/* Experimenter extension message. */
struct ofp_experimenter_msg {
struct ofp_header header; /* Type OFPT_EXPERIMENTER. */
uint32_t experimenter; /* Experimenter ID: 
uint32_t exp_type; /* Experimenter defined. */
uint8_t experimenter_data[0];/* Experimenter-defined
arbitrary additional data.
*/
};
OFP_ASSERT(sizeof(struct ofp_experimenter_msg) == 16);
```

In order to support the transmission of the BIER header information and to provide interfaces between the OpenFlow forwarding devices supporting the forwarding of the BIER by the OpenFlow controller, various operations can be performed on the flow table on the OpenFlow forwarding device which is used for the forwarding of the BIER. For example, one Experimenter ID is newly defined in the above OpenFlow Experimenter Message.

Accordingly, the respective OpenFlow object of the Experimenter extension is provided. That is to say, the flow table also needs to be extended. The flow table generated by the OpenFlow controller includes: an OpenFlow Extensible Match (OXM), an action set, a queue scheduling, and Error code notifications, etc.

Herein, in the OXM that needs to be extended, the information included in the BIER header needs to be added and defined, that is, the BIER forwarding information includes BIER Sub-domain information, BitStringLength information, Set Identifier information and BitString information, or BIER Multi-Protocol Label Switching (MPLS) label information, i.e. BIER-MPLS label information and BitString information. Further, the BIER forwarding information may also include one or more of Entropy information, Time To Live (TTL) information, Type Of Service (TOS) information or Bit Forwarding Ingress Router identification (BFIR-ID). Herein, Flow Match field needs to support the matching in the BIER header information, especially the BIER Sub-domain, BitStringLength information, Set Identifier information and BitString information, so the extension of the OXM Experimenter Flow Match is defined as below fields:

```
enum oxm_ofb_experimenter_bierh_match {
OXM_OF_BIERH_Subdomain_ID = 0, /* Match Subdomain
in BIERH */
OXM_OF_BIERH_BitStringLength = 1, /* Match BSL in BIERH */
OXM_OF_BIERH_Set_Identifier = 2, /* Match SI in BIERH */
OXM_OF_BIERH_BitString = 3, /* Match BitString in BIERH */
OXM_OF_BIERH_MPLS_Label = 4, /* Match MPLS Label
for BIER*/
OXM_OF_BIERH_Entropy = 5, /* Match Entropy in BIERH */
OXM_OF_BIERH_TOS = 6, /* Match TOS in BIERH */
OXM_OF_BIERH_BFIR-id = 7, /* Match BFIR-id in BIERH */
};
```

Optionally, the extended action set, that is, the action set of the BIER flow table, includes one or more of Push BIER Header, Pop BIER Header, Push BIER-MPLS header, Swap BIER-MPLS header, Pop BIER-MPLS header, or Set BitString information. In addition, the action set of the BIER flow table may also include one or more of Set Entropy information, Set TOS information, or Decrement TTL information. Herein, the extension is defined as follows:

```
enum                            ofp_experimenter_bierh_action {
OFPAT_PUSH_BIERH = 0, /* Push BIERH onto packet */
OFPAT_POP_BIERH = 1, /* Pop BIERH off packet */
OFPAT_SET_BitString = 2, /* Set BitString */
OFPAT_PUSH_MPLS = 3, /* Push MPLS */
OFPAT_SWAP_MPLS = 4, /* Swap MPLS */
OFPAT_POP_MPLS = 5, /* Pop MPLS */
OFPAT_SET_Entropy = 6, /* Set Entropy */
OFPAT_SET_TOS = 7, /* Set TOS */
OFPAT_DEC_TTL=8, /*Decrement TTL */
};
```

In the application, different actions in the action set of the BIER flow table are performed on different devices, which can be as follows:

1. The action of Push BIER header is performed on the ingress forwarding device within the BIER domain. After the operation of Push BIER header is completed, the forwarding of the BIER pocket is started;

2. The action of Pop BIER header is performed on the egress forwarding device within the BIER domain. After the operation of Pop BIER header is completed, the forwarding of the BIER pocket is completed, and the normal multicast forwarding is performed;

3. The action of Set BitString is performed on all forwarding devices.

In addition, BIER-MPLS related actions are applied in the forwarding process of the BIER-MPLS, the performing manner is as follows:

1. The action of Push MPLS header is performed on the ingress forwarding device within the BIER domain. After the operation of Push MPLS header is completed, the forwarding of the BIER-MPLS pocket is started;

2. The action of Pop MPLS header is performed on the egress forwarding device within the BIER domain. After the operation of Pop MPLS header is completed, the forwarding of the BIER-MPLS pocket is completed, and the normal multicast forwarding is performed;

3. The action of Swap MPLS header is performed on all intermediate forwarding devices.

Figure 12:
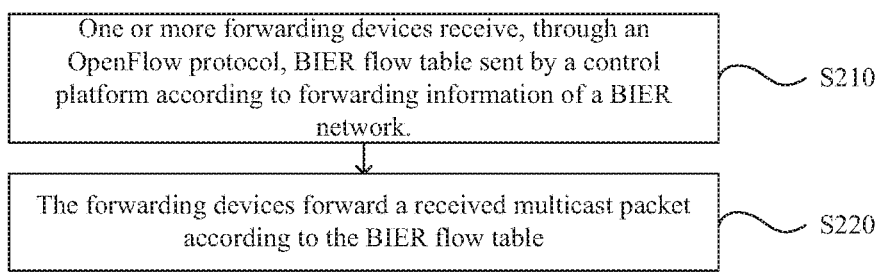
FIG. 12 is a flowchart of still another information transmission method according to an embodiment of the present disclosure.

FIG. 12 is a flowchart of still another information transmission method according to an embodiment of the present disclosure. The information transmission method in this embodiment is applicable to the situation that the multicast packet is forwarded in the SDN network. The method can be implemented by an information transmission apparatus. The information transmission apparatus can be implemented by combining hardware and software. The information transmission apparatus can be integrated into a processor of one or more forwarding devices for use by the processor. As shown in FIG. 12, the method in this embodiment can include:

In operation S210, one or more forwarding device receive, through an OpenFlow protocol, BIER flow table sent by a control platform according to forwarding information of a BIER network.

The information transmission method according to the embodiments of the present disclosure forwards the multicast packet in the SDN network in a forwarding manner which is based on the BIER technology. The forwarding operation of the multicast pocket is performed through the BIER flow table, therefore, before the one or more forwarding devices forward the multicast pocket, the one or more forwarding devices need to receive the BIER flow table sent by the control platform through the OpenFlow protocol. The BIER flow table is sent by the control platform according to the forwarding information of the BIER network. In the above embodiment, it has been pointed out that the BIER flow table in the embodiments of the present disclosure is different from the OpenFlow flow table in the related art.

In this embodiment, the forwarding information of the BIER network may include: multicast flow information and BIER egress node set information; or BIER forwarding information of each forwarding device in the network; or multicast flow information, BIER egress node set information and BIER forwarding information of each forwarding device in the network. In this embodiment, the forwarding information of the BIER network is generated by the control platform according to the BIER network information. The BIER network information may include one or more of forwarding device information of the BIER network, network topology information, or multicast overlay information of the BIER network.

In this embodiment, the BIER flow table received by the one or more forwarding devices includes information corresponding to the forwarding information of the BIER network. The BIER flow table includes: multicast flow information and BIER information; or BIER forwarding information; or multicast flow information, BIER information, and BIER forwarding information. It can be seen that, the content of the information in the BIER flow table corresponds to the content of the forwarding information of the BIER network generated by the control platform.

It should be noted that, in the forwarding information of the BIER network, the multicast flow information and the BIER information sent by the control platform can be received only by the ingress forwarding device. Herein, the multicast flow information includes one or more of multicast source information, multicast group information, or information configured to identify the feature of the multicast flow. The BIER information includes a BitString. The BitString is formed by a set of BIER egress forwarding devices. In addition, the BIER forwarding information sent by the control platform can be received by each forwarding device.

In operation S220, the one or more forwarding devices forward a received multicast packet according to the BIER flow table.

The application basis of this embodiment is the OpenFlow technology, various operations performed on the multicast packet by the one or more forwarding devices are also according to the BIER flow table in the forwarding device, that is, the one or more forwarding devices receive the BIER flow table sent by the control platform through the OpenFlow protocol. Then, when the multicast packet is received, the matching of the BIER flow table, the processing of the multicast pocket and the forwarding of the multicast pocket performed in the one or more forwarding devices are according to the flow table. Different from the related art, in the embodiments of the present disclosure, the flow table received by the one or more forwarding devices is the BIER flow table which contains the forwarding information of the BIER network. That is to say, the transmission of the multicast packet among the forwarding devices is not in a form of multicast IP packets, but is in a form of being packaged in a specific BIER header which is similar to the BIER header as packaged in the BIER forwarding method. Therefore, the intermediate forwarding device can search for the flow table according to the information in the BIER header and perform the routing. All egress forwarding devices of the multicast packet are also marked in the information in the BIER header, which can ensure that the multicast packet can be forwarded to all egress forwarding devices.

Through the information transmission method in this embodiment, the BIER flow table in any forwarding device does not need to be changed, i.e. the control platform also does not need to update the BIER flow table, when the network topology and the flow performing the multicast packet transmission are unchanged. Further, even when a multicast packet which is need to be sent in the network is added, only the BIER flow table for the ingress forwarding device can be affected, the BIER flow tables in other forwarding devices cannot be affected. That is to say, the transmission of different flows can be implemented by only updating the BIER flow table in the egress forwarding device via the control platform. Compared with the group table forwarding manner based on the flow in the related OpenFlow technology, a system space occupied by the flow table is greatly decreased and the forwarding efficiency for the multicast packet can be increased.

It should be noted that, in this embodiment, the operation that the one or more forwarding devices receive the BIER flow table sent by the control platform can be performed in advance before the one or more forwarding devices receive the multicast packet, or can be performed after the one or more forwarding devices receive the multicast packet. Herein, after the one or more forwarding devices receive the multicast packet, if the BIER flow table is not matched, the related information of the multicast packet to be forwarded is transmitted to the control platform, then the control platform sends an updated BIER flow table to the one or more forwarding devices.

In the information transmission method according to this embodiment, the one or more forwarding devices receive the BIER flow table sent by the control platform according to the forwarding information of the BIER network, therefore the one or more forwarding devices can forward the received multicast pocket according to the received BIER flow table. Herein, the forwarding information of the BIER network is generated by the control platform according to BIER network information. In this embodiment, though the manner in which of the one or more forwarding devices receive BIER flow table, if a multicast flow needs to be added when the network topology is unchanged, only the BIER flow table for the ingress forwarding device needs to be changed. This embodiment solves the problem that the space occupied by entries is relatively large and the forwarding efficiency is relatively low because it is necessary to establish a corresponding flow table and a corresponding group table on each forwarding device for each flow when the multicast packet is forwarded using the related OpenFlow technology.

In the implementation of the embodiments of the present disclosure, the control platform also needs to acquire the BIER network information before generating the BIER flow table. The acquisition manner can also be: the control platform acquires the BIER network information from the APP; the control platform acquires the BIER network information through the interface between the OpenFlow controller and the forwarding device; or the control platform acquires the BIER network information through the interfaces between the control platform and other management and control platforms. The manners and application scenarios of acquiring the BIER network information by the control platform in this embodiment are the same as those in the foregoing embodiment. The reference can also be made to the application scenarios shown in FIG. 5 to FIG. 7, and therefore details will not described herein again.

Figure 13:
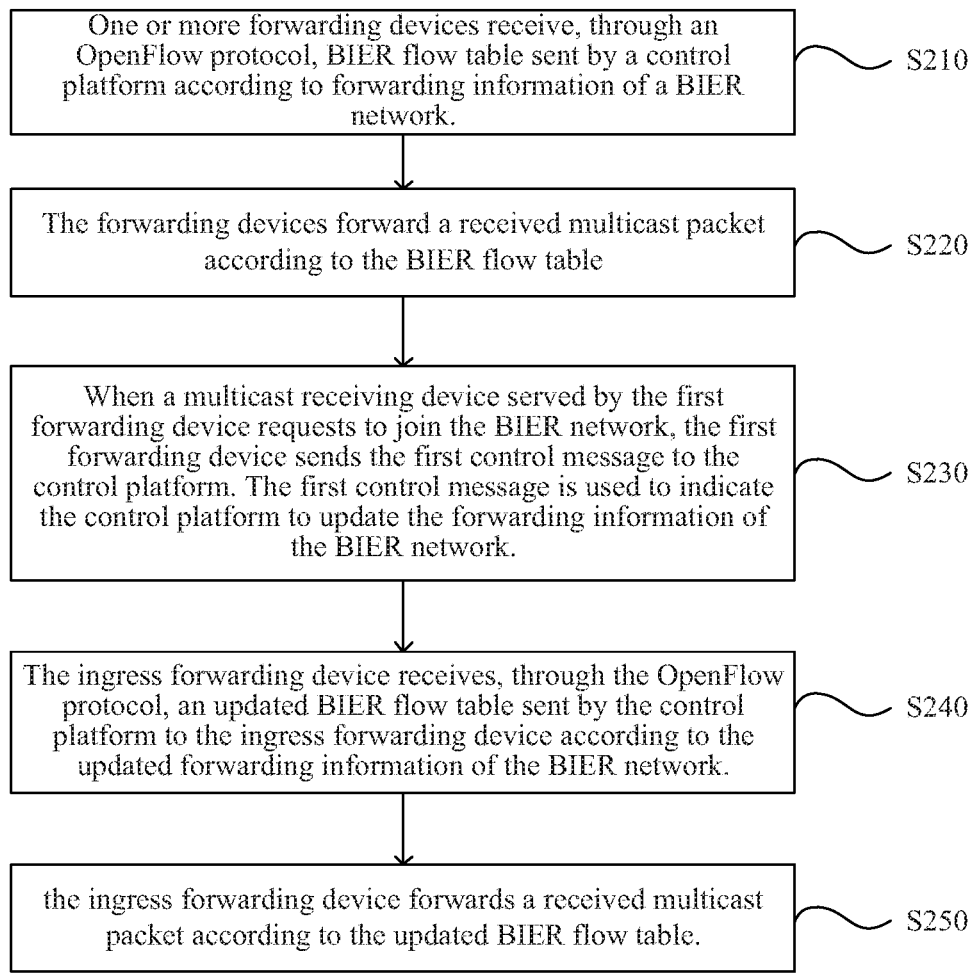
FIG. 13 is a flowchart of still another information transmission method according to an embodiment of the present disclosure.

Optionally, FIG. 13 is a flowchart of still another information transmission method according to an embodiment of the present disclosure. On the basis of the embodiment shown in above FIG. 12, the method according to this embodiment may further include:

In operation S230, when a multicast receiving device served by the first forwarding device requests to join the BIER network, the first forwarding device sends the first control message to the control platform. The first control message is used to indicate the control platform to update the forwarding information of the BIER network.

This embodiment can also refer to the application scenario shown in FIG. 9, in this embodiment, the position of the first forwarding device in the network (i.e. the egress forwarding device), the manner in which the first forwarding device sends the first control message and the application examples are as same as that in the above embodiment, and therefore will not described herein again.

In operation S240, the ingress forwarding device receives, through the OpenFlow protocol, an updated BIER flow table sent by the control platform to the ingress forwarding device according to the updated forwarding information of the BIER network.

In operation S250, the ingress forwarding device forwards a received multicast packet according to the updated BIER flow table.

It should be noted that, the execution sequence of the operations S230 to S250 in this embodiment and the operations S210 and S220 in the above embodiment are not limited, and the operations S230 to S250 may be performed before the operations S210 and S220, or may be performed after the operations S210 and S220, the embodiment shown in FIG. 13 is an example that the operations S230 to S250 are performed after the operations S210 and S220.

Figure 14:
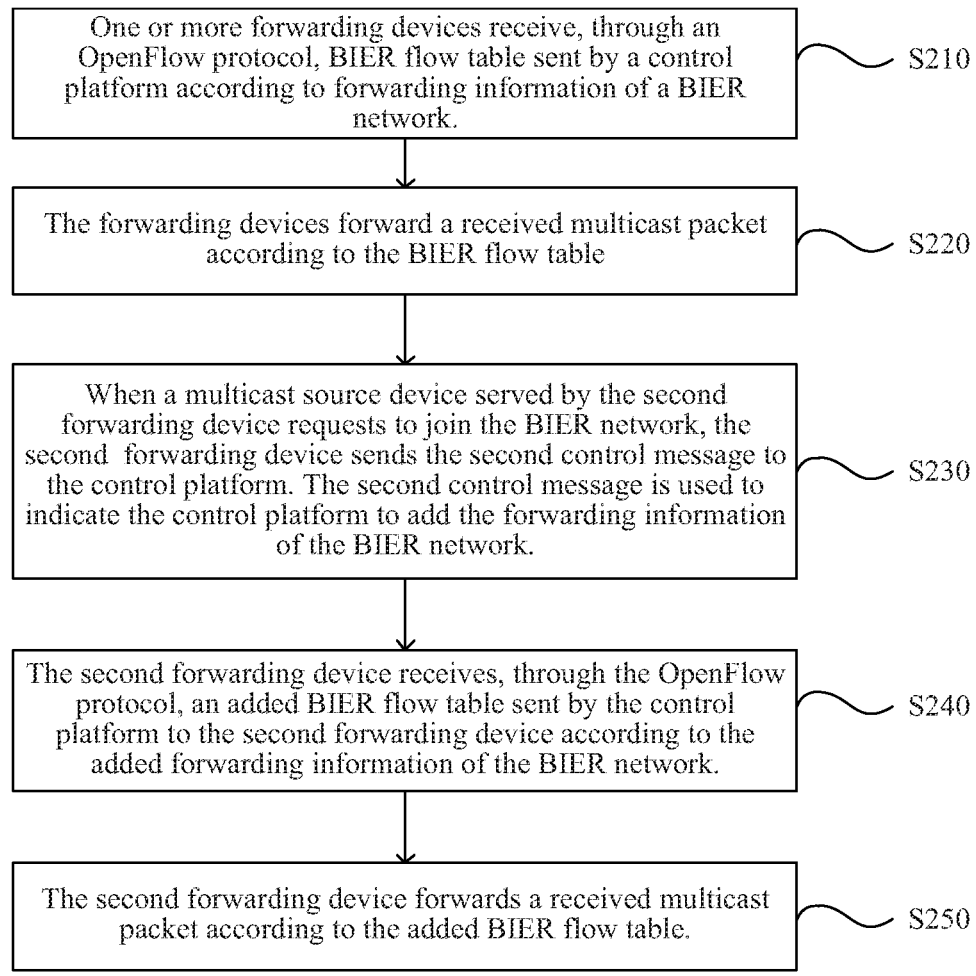
FIG. 14 is a flowchart of still another information transmission method according to an embodiment of the present disclosure.

Optionally, FIG. 14 is a flowchart of still another information transmission method according to an embodiment of the present disclosure. On the basis of the embodiment shown in above FIG. 12, the method provided in this embodiment may further include:

In operation S230, when a multicast source device served by the second forwarding device requests to join the BIER network, the second forwarding device sends the second control message to the control platform. The second control message is used to indicate the control platform to add the forwarding information of the BIER network.

This embodiment can also refer to the application scenario shown in FIG. 11, the position of the second forwarding device in the network (i.e. the ingress forwarding device), the manner in which the second forwarding device sends the second control message and the application examples in this embodiment are as same as that in the above embodiment, and therefore details will not described herein again.

In operation S240, the second forwarding device, through the OpenFlow protocol, an added BIER flow table sent by the control platform to the second forwarding device according to the added forwarding information of the BIER network.

In operation S250, the second forwarding device forwards a received multicast packet according to the added BIER flow table.

It should be noted that, the execution sequence of the operations S230 to S250 in this embodiment and the operations S210 and S220 in the above embodiment are not limited, and the operations S230 to S250 may be performed before the operations S210 and S220, or may be performed after the operations S210 and S220, the embodiment shown in FIG. 14 is an example that the operations S230 to S250 are performed after the operations S210 and S220.

It can be seen from the above embodiments shown in FIG. 13 and FIG. 14, when a multicast receiving device or a multicast source device dynamically joins the BIER network, only the BIER flow table for the ingress forwarding device needs to be updated, and only the updated BIER flow table needs to be sent. Through the information transmission method provided in this embodiment, the scope and content of the flow table to be updated is decreased, which is beneficial to decrease the space occupied by the flow table and to effectively improve the forwarding efficiency for the multicast packet, compared with the updating manner in the related art in which in which once a multicast receiving device or a multicast source device has been dynamically joined the BIER network, the flow tables and the group tables in all OpenFlow forwarding devices need to be updated and the updated flow tables and the updated group tables need to be sent to each OpenFlow forwarding device.

In the implementation of this embodiment, the content of the BIER flow table received through the OpenFlow protocol is different from the content of the flow table in the related OpenFlow technology, therefore, it is necessary to extend the OpenFlow protocol to support the transmission of the flow table of BIER related information. The extension of the OpenFlow Experimenter message in this embodiment and the extension of each flow entry in the BIER flow table received by the one or more forwarding devices are related to that in the foregoing embodiments, and therefore details will not described herein again.

The application scenarios and application manners of the information transmission method provided by this embodiment are described in detail below through some examples.

The First Example

Figure 15:
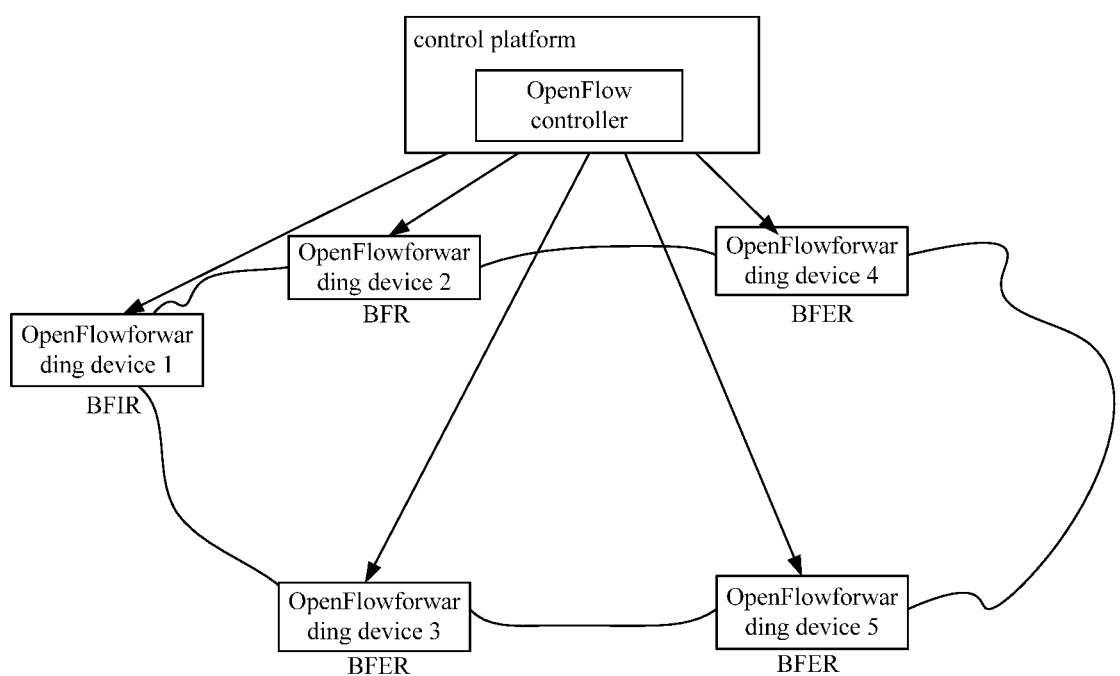
FIG. 15 is a schematic diagram of an application scenario of an information transmission method according to the first example of the present application.

FIG. 15 is a schematic diagram of an application scenario of an information transmission method according to the first example of the present application. FIG. 15 is a schematic diagram illustrating that the control platform sends the multicast flow information and the BIER information in the BIER flow table through the OpenFlow protocol in the present application. As shown in FIG. 15, the control platform sends the BIER flow table including the multicast flow information and the BIER information to the ingress forwarding device (i.e. BFIR) in the BIER domain through the OpenFlow protocol, according to the multicast flow information and the information of the set of the BIER egress forwarding device (i.e. BFER).

The Second Example

Figure 16:
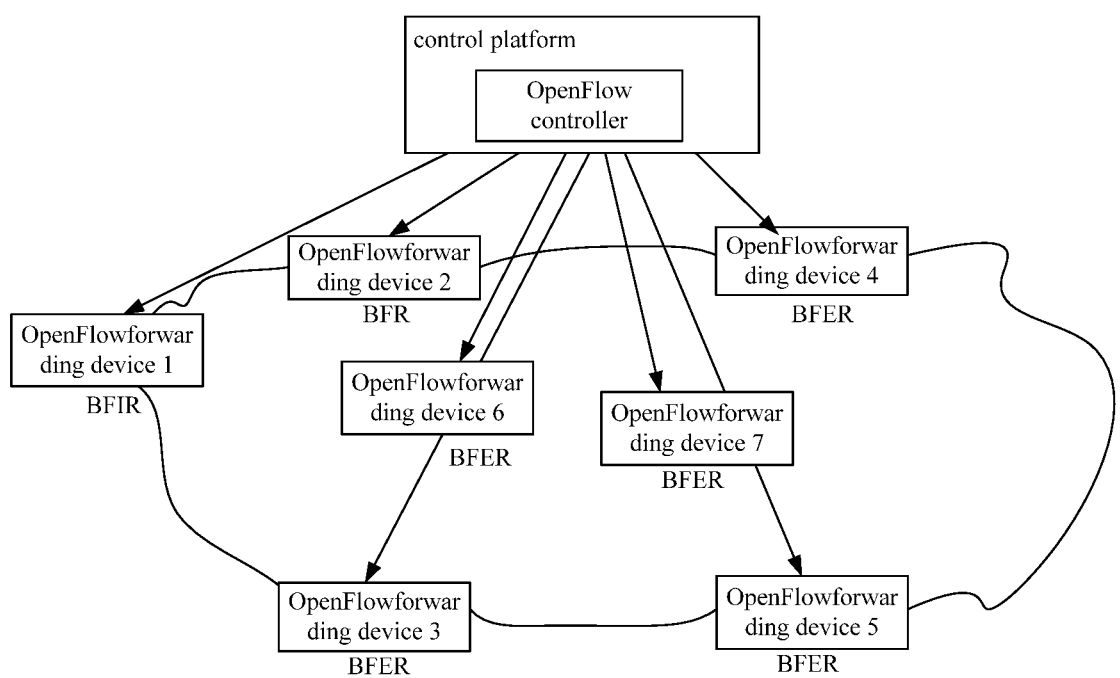
FIG. 16 is a schematic diagram of an application scenario of an information transmission method according to the second example of the present application.

FIG. 16 is a schematic diagram of an application scenario of an information transmission method according to the second example of the present application. FIG. 16 is a schematic diagram illustrating that the control platform sends the BIER forwarding information in the BIER flow table through the OpenFlow protocol. As shown in FIG. 16, the control platform sends the BIER flow table including the BIER forwarding information to each forwarding device (i.e. BFR) in the BIER domain through the OpenFlow protocol, according to the BIER forwarding information of each forwarding device in the network.

It should be noted that, the control platform can also send the BIER flow table including the multicast flow information and the BIER information to the ingress node forwarding device (i.e. BFIR) in the BIER domain and send the BIER flow table including the BIER forwarding information to each forwarding device (i.e. BFR) through the OpenFlow protocol, according to the multicast flow information, the information of the BIER egress forwarding device, and the BIER forwarding information of each forwarding device in the network.

The Third Example

Figure 17:
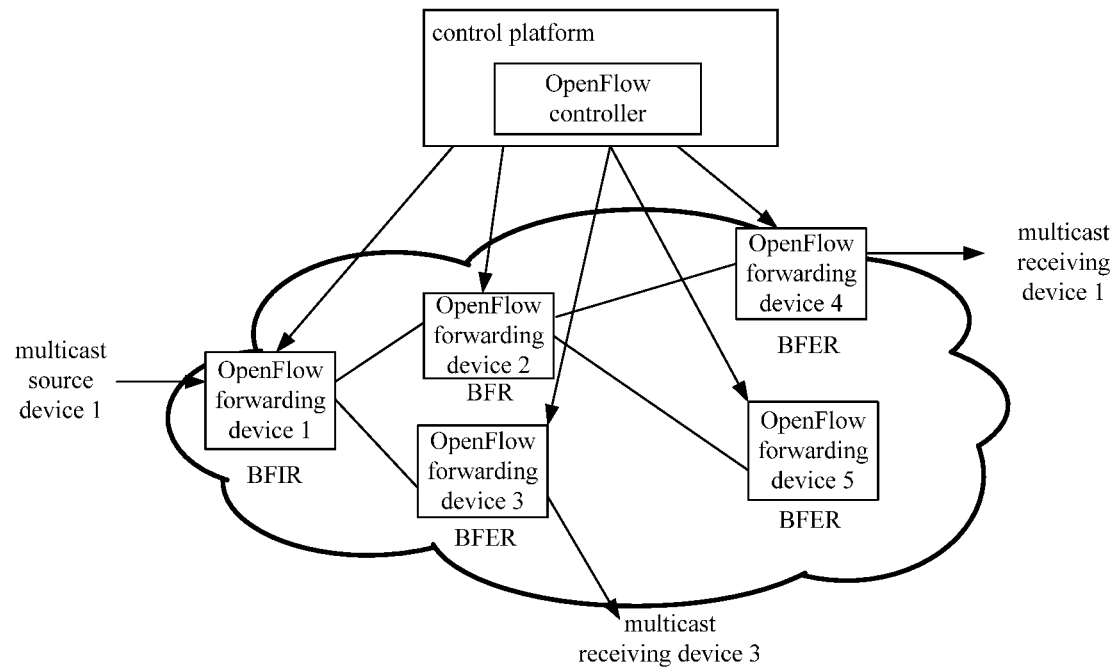
FIG. 17 is a schematic diagram of an application scenario of an information transmission method according to the third example of the present application.

FIG. 17 is a schematic diagram of an application scenario of an information transmission method according to the third example of the present application. As shown in FIG. 17, it shows that the forwarding manner of the multicast packet of the flow table is searched based on the basic information of the BIER. The control platform has been transmitted the BIER flow table including the BIER basic information to each OpenFlow forwarding device in the network. For example, the multi-levels BIER flow tables on the OpenFlow forwarding device 1 which is the ingress OpenFlow forwarding device of the multicast source device include the multicast flow information, the BIER information and the BIER forwarding information. The multi-levels BIER flow tables on the OpenFlow forwarding device 1 are shown in below tables 3 to 5 respectively, for example.

TABLE 3

First level BIER flow table 1 for OpenFlow forwarding device 1

| Match Fields | | | Instructions |
|---|---|---|---|
| VPN-ID | Source IP | Group IP | Push BIER Header<br>Goto Table 2 |

TABLE 4

Second level BIER flow table 2 for OpenFlow forwarding device 1

| Match Fields | | | Instructions |
|---|---|---|---|
| Sub-domain | BitStringLength | Set Identifier | Goto Table 3 |

TABLE 5

Third level BIER flow table 3 for OpenFlow forwarding device 1

| Match Fields | Instructions |
|---|---|
| BitString | Set BitString<br>Output<br>Set BitString<br>Goto Table 3 |

The multi-levels BIER flow tables on the OpenFlow flow table forwarding device 2 which is the intermediate OpenFlow forwarding device include the BIER forwarding information. The multi-levels BIER flow tables on the OpenFlow forwarding device 2 are shown in below tables 6 to 7 respectively, for example.

TABLE 6

First level BIER flow table 1 for OpenFlow forwarding device 2

| Match Fields | | | Instructions |
|---|---|---|---|
| Sub-domain | BitStringLength | Set Identifier | Goto Table 2 |

TABLE 7

Second level BIER flow table 2 for OpenFlow forwarding device 1

| Match Fields | Instructions |
|---|---|
| BitString | Set BitString<br>Output<br>Set BitString<br>Goto Table 2 |

The multi-levels BIER flow tables on the OpenFlow forwarding device 3, the OpenFlow forwarding device 4 and the OpenFlow forwarding device 5 which are the egress OpenFlow forwarding device include the BIER forwarding information. The multi-levels BIER flow tables on these OpenFlow forwarding devices are shown in tables 6 and 8 respectively, for example. Herein, the first level BIER flow table is as same as the above table 6.

TABLE 8

Second level BIER flow table 2 for egress OpenFlow forwarding device

| Match Fields | Instructions |
|---|---|
| BitString | Pop BIER ether Header<br>Output |

In the implementation of the embodiment shown in FIG. 17, when the OpenFlow forwarding device 1 receives the multicast packet, it determines that which VIP-ID the packet belongs to. If the VPN-ID defaults to 0, the packet is the multicast packet of a public network. The processing procedure on each OpenFlow forwarding device is as follows:

The ingress OpenFlow forwarding device, i.e. the OpenFlow forwarding device 1 searches the BIER flow table 1 (Table 3) according to the source address and the destination group address in the multicast packet, if a table entry indexed by the source address and the destination group address is searched out, the BIER Header is pushed, and the table entry goes to the flow table 2 for further pipeline processing. Then, the BIER Sub-domain, the BitStringLength information and the Set Identifier information in the flow table 2 are further matched, if the matching is successful, the process goes to the flow table 3 for further pipeline processing. Then, the BitString information in the BIER flow table 3 is further matched, an AND operation is performed on the BitString information in the BIER header and the BitString information matching the BIER flow table 3 (Table 5), the result of the AND operation is used to update the BitString information, then, the updated multicast pocket is copied and the copied multicast pocket is output to the OpenFlow forwarding device 2. Further, the result of the above AND operation is reversed, an AND operation is performed again on the reversed result and the BitString information in the original BIER header, and the result of this AND operation is used to update the BitString information, then, the updated multicast pocket is copied and the copied multicast pocket goes to the OpenFlow forwarding device 3 for repeatedly processing, the updated multicast packet is output to the OpenFlow forwarding device 3. The action of the BIER flow table 3 is performed further, if the BitString is 0 after the AND operation is finished, the pocket is discarded.

After receiving the multicast pocket, the intermediate OpenFlow forwarding device, i.e. the OpenFlow forwarding device 2 searches the BIER flow table 1 (Table 6) according to the Sub-domain, the BitStringLength information and the Set Identifier information in the multicast packet, if a table entry indexed by the Sub-domain, the BitStringLength information and the Set Identifier information is searched out, the BIER header is pushed, and the table entry goes to the BIER flow table 2 for further pipeline processing. Then, the BitString information in the BIER flow table 2 is further matched, an AND operation is performed on the BitString information in the BIER header and the BitString information matching the BIER flow table 2, the result of the AND operation is used to update the BitString information, the updated multicast pocket is copied, the copied multicast pocket is output to the OpenFlow forwarding device 4. Further, the result of the above AND operation is reversed, an AND operation is performed again on the reversed result and the BitString information in the original BIER header, if the BitString is 0 after the AND operation is finished, the pocket is discarded.

After receiving the multicast pocket, the exgress OpenFlow forwarding device, i.e. the OpenFlow forwarding device 3 and the OpenFlow forwarding device 4 searches the BIER flow table 1 (Table 6) according to the Sub-domain, the BitStringLength information and the Set Identifier information in the multicast packet, if a table entry indexed by the Sub-domain, the BitStringLength information and the Set Identifier information is searched out, the BIER header is pushed, and the table entry goes to the BIER flow table 2 (Table 8) for further pipeline processing, the BIER header is popped out and the multicast pocket is output.

The Fourth Example

FIG. 17 is a schematic diagram of an application scenario of an information transmission method according to the fourth example of the present application. As shown in FIG. 17, it shows the forwarding manner of the multicast packet of the flow table is searched based on the BIER-MPLS. The control platform has been transmitted the flow table including the BIER-MPLS to each OpenFlow forwarding device in the network. For example, the multi-levels flow tables on the OpenFlow forwarding device 1 which is the ingress OpenFlow forwarding device of the multicast source device include the multicast flow information, the BIER information and the BIER forwarding information. The multi-levels BIER flow tables on the OpenFlow forwarding device 1 are shown in below tables 9 to 11, for example.

TABLE 9

First level BIER flow table 1 for OpenFlow forwarding device 1

| Match Fields | | | Instructions |
|---|---|---|---|
| VPN-ID | Source IP | Group IP | Push BIER Header<br>Push BIER-MPLS<br>Goto Table 2 |

TABLE 10

Second level BIER flow table 2 for OpenFlow forwarding device 1

| Match Fields | Instructions |
|---|---|
| BIER-MPLS | Goto Table 3 |

TABLE 11

Third level BIER flow table 3 for OpenFlow forwarding device 1

| Match Fields | Instructions |
|---|---|
| BitString | Set BitString<br>Push BIER-MPLS<br>Output<br>Set BitString<br>Goto Table 3 |

The multi-levels BIER flow tables on the OpenFlow forwarding device 2 which is the intermediate OpenFlow forwarding device include the BIER forwarding information. The multi-levels BIER flow tables on the OpenFlow forwarding device 2 are shown in below tables 12 to 13 respectively, for example.

TABLE 12

First level BIER flow table 1 for OpenFlow forwarding device 2

| Match Fields | Instructions |
|---|---|
| BIER-MPLS | Goto Table 2 |

TABLE 13

Second level BIER flow table 2 for OpenFlow forwarding device 1

| Match Fields | Instructions |
|---|---|
| BitString | Set BitString<br>Swap BIER-MPLS<br>Output<br>Set BitString<br>Goto Table 2 |

The multi-levels BIER flow tables on the OpenFlow forwarding device 3, the OpenFlow forwarding device 4 and the OpenFlow forwarding device 5 which are the egress OpenFlow forwarding device include the BIER forwarding information. The multi-levels BIER flow tables on these OpenFlow forwarding devices are shown in tables 12 and 14 respectively, for example. Herein, the first level flow table is as same as the above table 12.

TABLE 14

| Second level BIER flow table 2 for egress OpenFlow forwarding device | |
|---|---|
| Match Fields | Instructions |
| BitString | Pop BIER-MPLS<br>Pop BIER Header<br>Output |

In the implementation of the embodiment shown in FIG. 17, when the OpenFlow forwarding device 1 receives the multicast packet, it determines which VIP-ID the packet belongs to. If the VPN-ID defaults to 0, the packet is the multicast packet of a public network. The processing procedure on each OpenFlow forwarding device is as follows:

The ingress OpenFlow forwarding device, i.e. the OpenFlow forwarding device 1 searches for the BIER flow table 1 (Table 9) according to the source address and the destination group address in the multicast packet, if a table entry indexed by the source address and the destination group address is searched out, the BIER Header and the BIER-MPLS header are pushed, and the process goes to the flow table 2 for further pipeline processing. Then, the BIER-MPLS information in the BIER flow table 2 (Table 10) is further matched, if the matching is successful, the process goes to the flow table 3 for further pipeline processing. Then, the BitString information in the BIER flow table 3 is further matched, an AND operation is performed on the BitString information in the BIER header and the BitString information matching the BIER flow table 3, the result of the AND operation is used to update the BitString information, then, the updated multicast pocket is copied, the copied multicast pocket is output to the OpenFlow forwarding device 2. Further, the result of the above AND operation is reversed, an AND operation is performed again on the reversed result and the BitString information in the original BIER header and the result of this AND operation is used to update the BitString information, then, the updated multicast pocket is copied, the copied multicast pocket goes to the OpenFlow forwarding device 3 for processing repeatedly, the updated multicast pocket is output to the OpenFlow forwarding device 3. The action of the BIER flow table 3 is performed continuously, if the BitString is 0 after the AND operation is finished, the pocket is discarded.

After receiving the multicast pocket, the intermediate OpenFlow forwarding device, i.e. the OpenFlow forwarding device 2 searches the BIER flow table 1 (Table 12) according to the BIER-MPLS information in the multicast packet, if a table entry indexed by the BIER-MPLS information is searched out, the table entry goes to the BIER flow table 2 for further pipeline processing. Then, the BitString information in the BIER flow table 2 is further matched, then, an AND operation is performed on the BitString information in the BIER header and the BitString information used to match with the BIER flow table 2, the result of the AND operation is used to update the BitString information and swap the BIER-MPLS, then, the updated multicast pocket is copied, the copied multicast pocket is output to the OpenFlow forwarding device 4. Further, the result of the above AND operation is reversed, an AND operation is performed again on the reversed result and the BitString information in the original BIER header, if the BitString is 0 after the AND operation is finished, the pocket is discarded.

After receiving the multicast packet, the exgress OpenFlow forwarding device, i.e. the OpenFlow forwarding device 3 and the OpenFlow forwarding device 4 search for the BIER flow table 1 (Table 12) according to the BIER-MPLS information in the multicast packet. If an entry indexed by the BIER-MPLS information is searched out, the BIER header and the BIER-MPLS header are pushed, and the table entry goes to the BIER flow table 2 (Table 14) for further pipeline processing, the BIER-MPLS is popped out, the BIER header is popped out and the multicast pocket is output.

Figure 18:
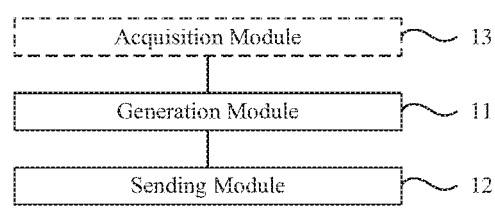
FIG. 18 is a schematic structural diagram of an information transmission apparatus according to an embodiment of the present disclosure.

FIG. 18 is a schematic structural diagram of an information transmission apparatus according to an embodiment of the present disclosure. The information transmission apparatus provided in this embodiment is applicable to the situation that the multicast packet is forwarded in the SDN network. The information transmission apparatus can be implemented by combining hardware and software. The information transmission apparatus can be integrated into a processor of a control platform for use by the processor. As shown in FIG. 18, the information transmission apparatus in this embodiment include a generation module 11 and a sending module 12 which are connected to each other.

The generation module 11 is arranged for generating forwarding information of a BIER network.

The information transmission apparatus according to the embodiments of the present disclosure forwards the multicast packet in the SDN network in a forwarding manner which is based on the BIER technology. The forwarding operation of the multicast packet is performed through the BIER flow table. Therefore, first, the control platform can acquire the BIER network information. The BIER network information may also include one or more of forwarding device information of the BIER network, network topology information, or multicast overlay information of the BIER network. After the acquisition module in this embodiment acquires the BIER network information, the forwarding information of the BIER network can be generated according to the BIER network information. The forwarding information of the BIER network may include: multicast flow information and BIER egress node set information; or BIER forwarding information of each forwarding device in the network; or multicast flow information, BIER egress node set information and BIER forwarding information of each forwarding device in the network.

The sending module 12 is arranged for sending, according to the forwarding information of the BIER network generated by the generation module 11, a BIER flow table to one or more forwarding devices through an OpenFlow protocol.

The BIER flow table in this embodiment is different from the OpenFlow flow table in the related art. As described above, during the process of forwarding the BIER multicast packet, the BIER flow table sent by the control platform to the one or more forwarding devices in this embodiment includes: multicast flow information and BIER information; or BIER forwarding information; or multicast flow information, BIER information, and BIER forwarding information. It can be seen that, the content of the information in the BIER flow table corresponds to the content of the forwarding information of the BIER network generated by the control platform.

It should be noted that, in the forwarding information of the BIER network, the multicast flow information and the BIER information are only sent to the ingress forwarding device, such as Bit Forwarding Ingress Router (BFIR). Herein, the multicast flow information includes one or more of multicast source information, multicast group information, or information configured to identify the feature of the multicast flow. The BIER information includes a BitString. The BitString is formed by a set of BIER egress forwarding devices. Further, the BIER forwarding information is forwarded to each forwarding device, such as Bit Forwarding Router (BFR).

In embodiments of the present disclosure, the BIER flow table is generated by the forwarding information of the BIER network. That is to say, the transmission of the multicast packet among the forwarding devices is not in a form of multicast IP packets, but is in a form of being packaged in a specific BIER header. Therefore, the intermediate forwarding device can search for the BIER flow table according to the information in the BIER header and perform the routing. All egress forwarding devices of the multicast packet are marked by the information in the BIER header, which can ensure that the multicast packet can be forwarded to all egress forwarding devices.

The information transmission apparatus according to the embodiment of the present disclosure is used to perform the information transmission method according to the embodiment shown in FIG. 4. The corresponding function module and its implementation principle and technical effect are similar to that in FIG. 4, and details will not described herein again.

The information transmission apparatus in this embodiment further include: an acquisition module 13 which is connected to the generation module 11 and arranged for acquiring BIER network information before the generation module 11 generates the forwarding information of the BIER network. The manner in which the acquisition module 13 acquires the BIER network information can be: the acquisition module 13 is arranged for acquiring the BIER network information from an application platform APP; or the acquisition module is further arranged for acquiring the BIER network information by an interface between the control platform and each forwarding device; or the acquisition module is further arranged for acquiring the BIER network information by interfaces between the control platform and other management or control platforms. In this embodiment, the manner in which the acquisition module 13 acquires the BIER network information and its application scenarios are as same as those in the foregoing embodiment. Reference can also be made to the application scenarios shown in FIGS. 5 to 7, and therefore details will not be described herein again.

Figure 19:
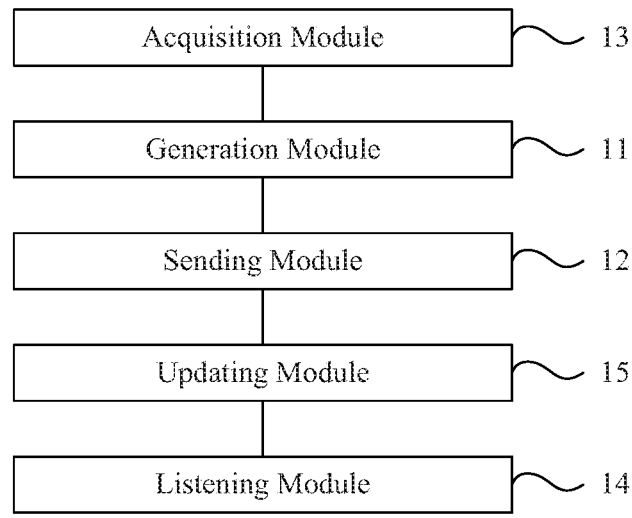
FIG. 19 is a schematic structural diagram of another information transmission apparatus according to an embodiment of the present disclosure.

Optionally, FIG. 19 is a schematic structural diagram of another information transmission apparatus according to an embodiment of the present disclosure. On the basis of the above embodiment shown in FIG. 18, the apparatus according to this embodiment may further includes: a listening module 14 and an updating module 15 which are connected to each other, the updating module 15 is also connected to the sending module 12. Herein, the listening module 14 is arranged for listening to a first control message, the first control message is sent by a first forwarding device when a multicast receiving device served by the first forwarding device requests to join the BIER network. The updating module 15 is arranged for updating the forwarding information of the BIER network according to the first control message listened by the listening module 14. The sending module 12 is arranged for sending, through the OpenFlow protocol, an updated BIER flow table to an ingress forwarding device according to the forwarding information of the BIER network updated by the updating module 15.

This embodiment can also refer to the application scenario shown in FIG. 9, in this embodiment, the position of the first forwarding device in the network (i.e. the egress forwarding device), the manner in which the first forwarding device sends the first control message and the application examples are as same as that in the above embodiment, and therefore details will not be described herein again.

It should be noted that, the execution sequence of the operation that the listening module 14 listens the first control message in this embodiment and the operation that the sending module 12 sends the BIER flow table in the above embodiment is not limited. The first control message can be listened by the listening module 14 before or after the sending module 12 sends the BIER flow table.

The information transmission apparatus according to the embodiments of the present disclosure is used to perform the information transmission method according to the embodiment shown in FIG. 8. The corresponding function module and its implementation principle and the technical effect are similar and details will not be described herein again.

In another possible implementation of this embodiment, the listening 14 module in the embodiment shown in FIG. 19 is arranged for listening to a second control message, the second control message is sent by a second forwarding device when a multicast source device served by the second forwarding device requests to join the BIER network. Accordingly, the updating module 15 is arranged for adding new forwarding information of the BIER network according to the second control message listened by the listening module 14. The sending module 12 is further arranged for sending an added BIER flow table to the second forwarding device according to the forwarding information of the BIER network added by the updating module 15.

This embodiment can also refer to the application scenario shown in FIG. 11, in this embodiment, the position of the second forwarding device in the network (i.e. the ingress forwarding device), the manner in which the second forwarding device sends the second control message and application examples are as same as that in the above embodiment, and therefore details will not be described herein again.

It should be noted that, the execution sequence of the operation that the listening module 14 listens the second control message in this embodiment and the operation that the sending module 12 sends the BIER flow table in the foregoing embodiment is not limited. The second control message can be listened by the listening module 14 before or after the sending module 12 sends the BIER flow table.

The information transmission apparatus according to the embodiments of the present disclosure is used to perform the information transmission method according to the embodiment shown in FIG. 10. The corresponding function module and its implementation principle and technical effect are similar and details will not be described herein again.

In the implementation of the embodiments of the present disclosure, the content of the BIER flow table sent through the OpenFlow protocol is different from the content of the flow table in the related OpenFlow technology, therefore, it is necessary to extend the OpenFlow protocol to support the transmission of the BIER flow table having the forwarding information of the BIER network. The extension of the OpenFlow Experimenter message and the extension of each flow entry in the BIER flow table received by the one or more forwarding devices in this embodiment are related to that in the above embodiments, and therefore details will not be described herein again.

In an implementation, the sending module 12 and the listening module 14 in the embodiment shown in FIG. 18 and FIG. 19 can be implemented by using a transceiver in the control platform. The generation module 11, the acquisition module 13 and the updating module 15 can be implemented by the processor of the control platform. The processor can be, for example, a Central Processing Unit (CPU), or an Application Specific Integrated Circuit (ASIC), or one or more integrated circuits which can implementing the embodiments of the present disclosure.

Figure 20:
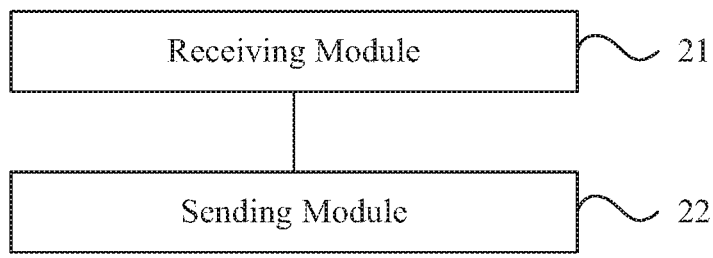
FIG. 20 is a schematic structural diagram of still another information transmission apparatus according to an embodiment of the present disclosure.

FIG. 20 is a schematic structural diagram of still another information transmission apparatus according to an embodiment of the present disclosure. The information transmission apparatus according to this embodiment is applicable to the situation that the multicast packet is forwarded in the SDN network. The information transmission apparatus can be implemented by combining hardware and software. The information transmission apparatus can be integrated into a processor of one or more forwarding devices for use by the processor. As shown in FIG. 20, the information transmission apparatus in this embodiment includes a generation module 21 and a sending module 22 which are connected to each other.

Herein, the receiving module 21 is arranged for receiving, through an OpenFlow protocol, a BIER flow table send by a control platform according to forwarding information of BIER network.

The information transmission apparatus according to the embodiments of the present disclosure forwards the multicast packet in the SDN network in a forwarding manner which is based on the BIER technology. The forwarding operation of the multicast pocket is performed through the BIER flow table, therefore, before the one or more forwarding devices forward the multicast pocket, the one or more forwarding devices need to receive the BIER flow table sent by the control platform through the OpenFlow protocol. The BIER flow table is sent by the control platform according to the forwarding information of the BIER network. In the above embodiment, the BIER flow tables in the embodiments of the present disclosure have been described as being different from the OpenFlow flow table in the related art.

In this embodiment, the forwarding information of the BIER network may include: multicast flow information and BIER egress node set information; or BIER forwarding information of each forwarding device in the network; or multicast flow information, BIER egress node set information and BIER forwarding information of each forwarding device in the network. In this embodiment, the forwarding information of the BIER network is generated by the control platform according to the BIER network information. The BIER network information may include one or more of forwarding device information of the BIER network, network topology information, or multicast overlay information of the BIER network.

In this embodiment, the BIER flow table received by the one or more forwarding devices includes information corresponding to the forwarding information of the BIER network. The BIER flow table includes: multicast flow information and BIER information; or BIER forwarding information; or multicast flow information, BIER information, and BIER forwarding information. It can be seen that, the content of the information in the BIER flow table corresponds to the content of the forwarding information of the BIER network generated by the control platform.

It should be noted that, in the forwarding information of the BIER network, the multicast flow information and the BIER information can be received only by the ingress forwarding device. Herein, the multicast flow information includes one or more of multicast source information, multicast group information, or information configured to identify the feature of the multicast flow. The BIER information includes a BitString. The BitString is formed by a set of BIER egress forwarding devices. In addition, the BIER forwarding information sent by the control platform can be received by each forwarding device.

The sending module 22 is arranged for forwarding a received multicast packet according to the BIER flow table received by the receiving module 21.

The application basis of this embodiment is the OpenFlow technology, various operations performed on the multicast packet by the sending device 22 are also according to the BIER flow table in the forwarding device, that is, after the receiving module 21 receives the BIER flow table sent by the control platform through the OpenFlow protocol, the matching of the BIER flow table, the processing of the multicast pocket and the forwarding of the multicast pocket can be performed according to the flow table when the multicast packet is received. Different from the related art, in the embodiments of the present disclosure, the flow table received by the receiving module 21 is the BIER flow table which contains the forwarding information of the BIER network. That is to say, the transmission of the multicast packet among the intermediate forwarding devices is not in a form of multicast IP packet, but in a form of being packaged into a specific BIER header which is similar to the BIER header as packaged in the BIER forwarding method. Therefore, the intermediate forwarding device can search for the flow table according to the information in the BIER header and perform the routing. All egress forwarding devices of the multicast packet are also marked in the information in the BIER header, which can ensure that the multicast packet can be forwarded to all egress forwarding devices.

Through the information transmission apparatus in this embodiment, the BIER flow table in any forwarding device does not need to be changed, i.e. the control platform also does not need to update the BIER flow table, when the network topology and the flow performing the multicast packet transmission are unchanged. Further, even when a multicast packet which is need to be transmitted in the network is added, only the BIER flow table for the ingress forwarding device can be affected, the BIER flow tables in other forwarding devices cannot be affected. That is to say, the transmission of different flows can be implemented when the control platform only updates the BIER flow table in the ingress forwarding device. Compared with the flow-based group table forwarding manner in the related OpenFlow technology, a system space occupied by the flow table is greatly decreased and the forwarding efficiency for the multicast packet can be increased.

The information transmission apparatus according to the embodiment of the present disclosure is used to perform the information transmission method according to the embodiment shown in FIG. 12. The corresponding function module and its implementation principle and technical effect are similar and details will not be described herein again.

In the implementation of the embodiments of the present disclosure, the control platform also needs to acquire the BIER network information before generating the BIER flow table. The acquisition manner can also be: the control platform acquires the BIER network information from the APP; or the control platform acquires the BIER network information through the interface between the platform controller and the forwarding device; or the control platform acquires the BIER network information through the interfaces between the control platform and other management and control platforms. The manners of acquiring the BIER network information by the control platform and application scenarios in this embodiment are the same as those in the foregoing embodiment. Reference can also be made to the application scenarios shown in FIGS. 5 to 7, and therefore details will not be described herein again.

Optionally, In a possible implementation of the embodiment of the present invention, the sending module 22 in the information transmission device arranged in the first forwarding device is further arranged for sending a first control message to the control platform when a multicast receiving device served by the first forwarding device requests to join the BIER network. Accordingly, in the information transmission device arranged in the ingress forwarding device, the receiving module 21 is further arranged for receiving, through the OpenFlow protocol, an updated BIER flow table sent by the control platform to the ingress forwarding device according to the updated forwarding information of the BIER network. The sending module 22 is further arranged for forwarding a received multicast packet according to the updated BIER flow table received by the receiving module.

This embodiment can also refer to the application scenario shown in FIG. 9, in this embodiment, the position of the first forwarding device in the network (i.e. the egress forwarding device), the manner in which the first forwarding device sends the first control message and the application examples are as same as that in the above embodiment, and therefore details will not be described herein again.

The information transmission apparatus according to the embodiments of the present disclosure is used to perform the information transmission method according to the embodiment shown in FIG. 13. The corresponding function module and its implementation principle and technical effect are similar and details will not described herein again.

In a possible implementation of the embodiment of the present invention, the sending module 22 in the information transmission device arranged in the second forwarding device is further arranged for sending a second control message to the control platform when a multicast source device served by the second forwarding device requests to join the BIER network. The second control message is configured to indicate the control platform to add the forwarding information of the BIER network. Accordingly, in the information transmission device arranged in the ingress forwarding device, the receiving module 21 is further arranged for receiving, through the OpenFlow protocol, an added BIER flow table sent by the control platform to the second forwarding device according to the added forwarding information of the BIER network.

This embodiment can also refer to the application scenario shown in FIG. 11, in this embodiment, the position of the second forwarding device in the network (i.e. the ingress forwarding device), the manner in which the second forwarding device sends the second control message and the application examples are as same as that in the above embodiment, and details will not be described herein again.

The information transmission apparatus according to the embodiment of the present disclosure is used to perform the information transmission method according to the embodiment shown in FIG. 14. The corresponding function module and its implementation principle and technical effect are similar, and details will not be described herein again.

In the implementation of the embodiments of the present disclosure, the content of the BIER flow table received through the OpenFlow protocol is different from the content of the flow table in the related OpenFlow technology, therefore, it is necessary to extend the OpenFlow protocol to support the transmission of the flow table of BIER related information. The extension of the OpenFlow Experimenter message in this embodiment and the extension of each flow entry in the BIER flow table received by the one or more forwarding devices are related to that in the foregoing embodiments, and details will not be described herein again.

In an implementation, the receiving module 21 and the sending module 22 in the embodiment shown in FIG. 20 can be implemented by the transceiver in the forwarding device.

Figure 21:
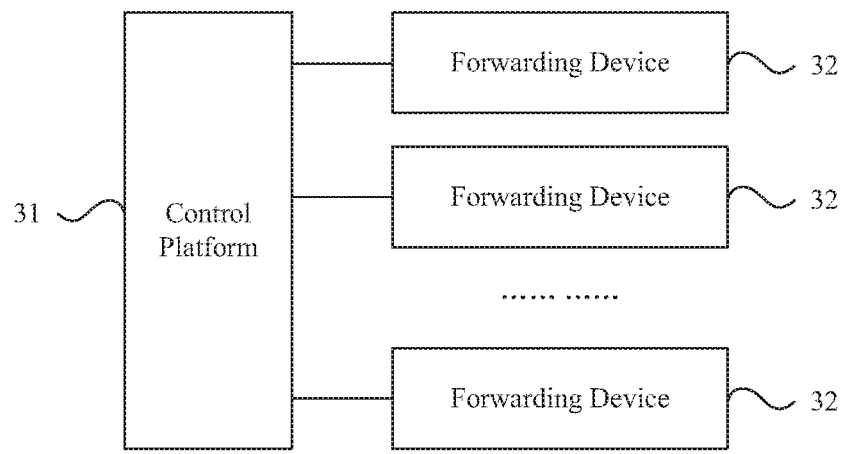
FIG. 21 is a schematic structural diagram of a data transmission system according to an embodiment of the present disclosure.

FIG. 21 is a schematic structural diagram of an information transmission apparatus according to an embodiment of the present disclosure. A data transmission system according to the embodiments is applicable to the situation that the multicast packet is forwarded in the SDN network. The data transmission system includes: a control platform 31 and a plurality of forwarding devices 32. Herein, the control platform 31 is provided with the information transmission device in the above embodiments shown in FIG. 18 and FIG. 19, each forwarding device 32 is provided with the information transmission apparatus in the above embodiments shown in FIG. 20. The manner in which each network element in the information transmission system according to the embodiments of the present disclosure performs the information transmission is as same as the manner in which the corresponding network element in the embodiments shown in FIG. 18 to FIG. 20 performs the date transmission. Each network element in the information transmission system can also be used to perform the information transmission method according to any embodiment shown in FIG. 4 to FIG. 17. The corresponding physical apparatus and its implementation principle and technical effect are similar and details will not described herein again.

The embodiment of the present disclosure further provides a computer readable storage medium containing computer executable instructions, the computer executable instructions can implement the above information transmission method applied to the control platform when be executed.

The embodiment of the present disclosure further provides a computer readable storage medium containing computer executable instructions, the computer executable instructions can implement the above information transmission method applied to the forwarding device when be executed.

One of ordinary skill in the art will appreciate that all or a portion of the above operations may be performed by instructing related hardware, such as a processor, through program which may be stored in a computer readable storage medium, such as a read only memory, disk or optical disk etc. Alternatively, all or a portion of the operations of the above embodiments may also be implemented using one or more integrated circuits. Correspondingly, each module/unit in the foregoing embodiments may be implemented in a form of hardware, for example, the corresponding function may be implemented by an integrated circuit, or may be implemented in a form of a software function module. For example, the corresponding function may be implemented by executing the program/instruction stored in a memory via a processor. Embodiments of the present disclosure are not limited to the combination of hardware and software in any specific form.

The embodiments disclosed in the present application are as described above, but the description is only for the purpose of understanding the present application, and is not intended to limit the present application. Any modification or change may be made to the form and details of the implementation by those skilled in the art without departing from the spirit and scope of the disclosure. And the protection scope of the present disclosure should follow the scope claimed by the appended claims.

INDUSTRIAL APPLICABILITY

The embodiments of the present disclosure provide an information transmission method, apparatus and system. Through sending the BIER flow table to one or more forwarding devices, the multicast flow can be added by only changing the BIER flow table for the ingress forwarding device, without changing the network topology. This embodiment solves the problem that the space occupied by entries is relatively large and the forwarding efficiency is relatively low because it is necessary to establish a corresponding flow table and a corresponding group table on each forwarding device for each flow when the multicast pocket is forwarded using the related OpenFlow technology.

The invention claimed is:

1. An information transmission method, comprising:
generating, by a control platform, forwarding information of a Bit Indexed Explicit Replication (BIER) network; and
sending, by the control platform according to the forwarding information of the BIER network, a BIER flow table to one or more forwarding devices through an OpenFlow protocol,
wherein the BIER flow table comprises BIER information, the BIER information comprising a BitString, the BitString being formed by a set of BIER egress forwarding devices, and
wherein the BIER information is only sent to an ingress forwarding device.

2. The method according to claim 1, wherein the BIER flow table further comprises: multicast flow information; or multicast flow information and BIER forwarding information,
wherein the multicast flow information comprises one or more of multicast source information, multicast group information, or information configured to identify a feature of a multicast flow; and the BIER forwarding information comprises BitString information.

3. The method according to claim 2, wherein the BIER forwarding information further comprises BIER Multi-Protocol Label Switching (BIER-MPLS) label information or one or more of BIER Sub-domain information, BitString-Length information or Set Identifier information; and
the BIER forwarding information further comprises one or more of Entropy information, Time To Live (TTL) information, Type Of Service (TOS) information, or Bit Forwarding Ingress Router Identifier (BFIR-ID).

4. The method according to claim 1, wherein an Action Set of the BIER flow table comprises one or more of Push BIER Header, Pop BIER Header, Push BIER Multi-Protocol Label Switching (BIER-MPLS) header, Swap BIER-MPLS header, Pop BIER-MPLS header or Set BitString information; and
the Action Set of the BIER flow table further comprises one or more of Set Entropy information, Set Type Of Service (TOS) information, or Decrement Time To Live (TTL) information.

5. The method according to claim 1, wherein the forwarding information of the BIER network generated by the control platform comprises: multicast flow information and BIER egress node set information; or BIER forwarding information of each forwarding device in the network; or multicast flow information, BIER egress node set information and BIER forwarding information of each forwarding device in the network.

6. The method according to claim 1, further comprising:
before generating, by the controlling platform, the forwarding information of the BIER network,
acquiring, by the control platform, BIER network information, wherein the BIER network information comprises one or more of forwarding device information of the BIER network, network topology information, or multicast overlay information of the BIER network,
wherein acquiring, by the control platform, the BIER network information comprises:
acquiring, by the control platform, the BIER network information from an application platform APP; or
acquiring, by the control platform, the BIER network information through an interface between the control platform and each of the one or more forwarding devices; or
the control platform acquires the BIER network information by interfaces between the control platform and other management or control platforms.

7. The method according to claim 1, further comprising:
listening, by the control platform, to a first control message, wherein the first control message is sent by a first forwarding device when a multicast receiving device served by the first forwarding device requests to join the BIER network;
updating, by the control platform, the forwarding information of the BIER network according to the first control message; and
sending, by the control platform according to the updated forwarding information of the BIER network, a updated BIER flow table to an ingress forwarding device through the OpenFlow protocol.

8. The method according to claim 1, further comprising:
listening, by the control platform, to a second control message, wherein the second control message is sent by a second forwarding device when a multicast source device served by the second forwarding device requests to join the BIER network;
adding, by the control platform, new forwarding information of the BIER network according to the second control message;
sending, by the control platform according to the added forwarding information of the BIER network, an added BIER flow table to the second forwarding device through the OpenFlow protocol.

9. The method according to claim 1, wherein the control platform is a Software Defined Network (SDN) controller; or the control platform is embedded into an SDN controller as an independent functional entity; or an OpenFlow controller is embedded into the control platform as a plugin.

10. An information transmission method, comprising:
receiving, by one or more forwarding devices through an OpenFlow protocol, a Bit Indexed Explicit Replication (BIER) flow table sent by a control platform according to forwarding information of a BIER network; and
forwarding, by the one or more forwarding devices, a received multicast packet according to the BIER flow table, wherein the BIER flow table comprises BIER information, the BIER information comprising a BitString, the BitString being formed by a set of BIER egress forwarding devices, and wherein the BIER information is only sent to an ingress forwarding device.

11. The method according to claim 10, wherein the BIER flow table further comprises: multicast flow information; or multicast flow information and BIER forwarding information, wherein the multicast flow information comprises one or more of multicast source information, multicast group information, or information configured to identify a feature of a multicast flow; and the BIER forwarding information comprises BitString information.

12. The method according to claim 11, wherein the BIER forwarding information further comprises BIER Multi-Protocol Label Switching (BIER-MPLS) label information or one or more of BIER Sub-domain information, BitString-Length information or Set Identifier information; and the BIER forwarding information further comprises one or more of Entropy information, Time To Live (TTL) information, Type Of Service (TOS) information, or Bit Forwarding Ingress Router identifier (BFIR-ID).

13. The method according to claim 10, wherein an Action Set of the BIER flow table comprises one or more of Push BIER Header, Pop BIER Header, Push BIER Multi-Protocol Label Switching (BIER-MPLS) header, Swap BIER-MPLS header, Pop BIER-MPLS header or Set BitString information; and the Action Set of the BIER flow table further comprises one or more of Set Entropy information, Set Type Of Service (TOS) information, or Decrement Time To Live (TTL) information.

14. The method according to claim 10, wherein the forwarding information of the BIER network comprises: multicast flow information and BIER egress node set information;

or BIER forwarding information of each forwarding device in the network; or multicast flow information, BIER egress node set information and BIER forwarding information of each forwarding device in the network.

15. The method according to claim 10, further comprising:

sending, by a first forwarding device, a first control message to the control platform when a multicast receiving device served by the first forwarding device requests to join the BIER network, the first control message being configured to indicate the control platform to update the forwarding information of the BIER network;

receiving, by an ingress forwarding device through the OpenFlow protocol, an updated BIER flow table sent by the control platform to the ingress forwarding device according to the updated forwarding information of the BIER network; and forwarding, by the ingress forwarding device, a received multicast packet according to the updated BIER flow table.

16. The method according to claim 10, further comprising:

sending, by a second forwarding device, a second control message to the control platform when a multicast source device served by the second forwarding device requests to join the BIER network, the second control message being configured to indicate the control platform to add new forwarding information of the BIER network; and receiving, by the second forwarding device through the OpenFlow protocol, an added BIER flow table sent by the control platform to the second forwarding device according to the added forwarding information of the BIER network.

17. The method according to claim 10, wherein the one or more forwarding devices comprise a physical router, a physical switch, a virtual router or a virtual switch.

18. An information transmission apparatus, provided in a control platform, the apparatus comprising:

a memory storing processor-executable instructions; and a processor arranged to execute the stored processor-executable instructions to perform steps of:

generating forwarding information of a Bit Indexed Explicit Replication (BIER) network; and sending, according to the forwarding information of the BIER network generated by the generation module, a BIER flow table to one or more forwarding devices through an OpenFlow protocol, wherein the BIER flow table comprises BIER information, the BIER information comprising a BitString, the BitString being formed by a set of BIER egress forwarding devices, and wherein the BIER information is only sent to an ingress forwarding device.

19. The apparatus according to claim 18, wherein the BIER flow table further comprises: multicast flow information; or multicast flow information and BIER forwarding information, wherein the multicast flow information comprises one or more of multicast source information, multicast group information, or information configured to identify a feature of a multicast flow; and the BIER forwarding information comprises BitString information.

20. The apparatus according to claim 19, wherein the BIER forwarding information further comprises BIER Multi-Protocol Label Switching (BIER-MPLS) label information or one or more of BIER Sub-domain information, BitStringLength information or Set Identifier information; and the BIER forwarding information further comprises one or more of Entropy information, Time To Live (TTL) information, Type Of Service (TOS) information, or Bit Forwarding Ingress Router Identifier (BFIR-ID).

* * * * *